(12) United States Patent
Jackson et al.

(10) Patent No.: US 10,759,014 B2
(45) Date of Patent: Sep. 1, 2020

(54) ADAPTIVE R744 MINIMUM QUANTITY COOLING LUBRICATION SYSTEM

(71) Applicants: David P. Jackson, Saugus, CA (US); Mackenzie A. Jackson, Saugus, CA (US); John J. Lee, Santa Clarita, CA (US)

(72) Inventors: David P. Jackson, Saugus, CA (US); Mackenzie A. Jackson, Saugus, CA (US); John J. Lee, Santa Clarita, CA (US)

(73) Assignee: HITACHI HIGH TECH CORPORATION, Tokyo (JP)

( * ) Notice: Subject to any disclaimer, the term of this patent is extended or adjusted under 35 U.S.C. 154(b) by 65 days.

(21) Appl. No.: 16/217,040

(22) Filed: Dec. 11, 2018

(65) Prior Publication Data

US 2019/0176285 A1 Jun. 13, 2019

Related U.S. Application Data

(60) Provisional application No. 62/597,526, filed on Dec. 12, 2017.

(51) Int. Cl.
| | |
|---|---|
| *B05B 7/12* | (2006.01) |
| *B23Q 11/10* | (2006.01) |
| *B23B 27/10* | (2006.01) |
| *C09K 5/04* | (2006.01) |
| *B23B 51/06* | (2006.01) |

(52) U.S. Cl.
CPC .......... *B23Q 11/1053* (2013.01); *B23B 27/10* (2013.01); *C09K 5/041* (2013.01); *B23B 51/06* (2013.01); *B23Q 11/1023* (2013.01); *B23Q 11/1038* (2013.01); *B23Q 11/1061* (2013.01); *C09K 5/042* (2013.01); *C09K 2205/106* (2013.01)

(58) Field of Classification Search
CPC ............ B23Q 11/1053; B23Q 11/1023; B23Q 11/1038; B23Q 11/1061; B23B 27/10; B23B 51/06; C09K 5/041; C09K 5/042; C09K 2250/106
USPC .......................................... 239/88, 413, 398
See application file for complete search history.

(56) References Cited

U.S. PATENT DOCUMENTS

| | | | |
|---|---|---|---|
| 6,200,198 B1 * | 3/2001 | Ukai .................. | B23Q 11/0042 451/449 |
| 9,381,574 B1 * | 7/2016 | Jackson .................. | B23B 27/10 |

(Continued)

*Primary Examiner* — Davis D Hwu
(74) *Attorney, Agent, or Firm* — Law Office of David Hong

(57) ABSTRACT

This application presents a method and apparatus for cooling a through-ported cutting tool with a source of liquid $CO_2$ with a compressed air line with a compressed air inlet and multiple $CO_2$ injection capillary segments; the capillary segments interconnect to the same source of liquid $CO_2$ and can have high pressure valves and throttles; the throttles have different sizes; a first capillary ends near the cutting tool; the second capillary ends near the compressed air inlet. Using a particular sequence of opening or closing the valves to the liquid $CO_2$ to the capillaries, mixing with the compressed air provides and recycling the residual $CO_2$, this invention provides for uniform and controlled cooling of the cutting tool within a certain temperature range.

17 Claims, 19 Drawing Sheets

(56) References Cited

U.S. PATENT DOCUMENTS

2004/0234350 A1* 11/2004 Jager ...................... B23B 51/06
409/136
2012/0237311 A1* 9/2012 Dionne .............. B23Q 11/1061
409/135

* cited by examiner

PRESENT INVENTION

PRESENT INVENTION

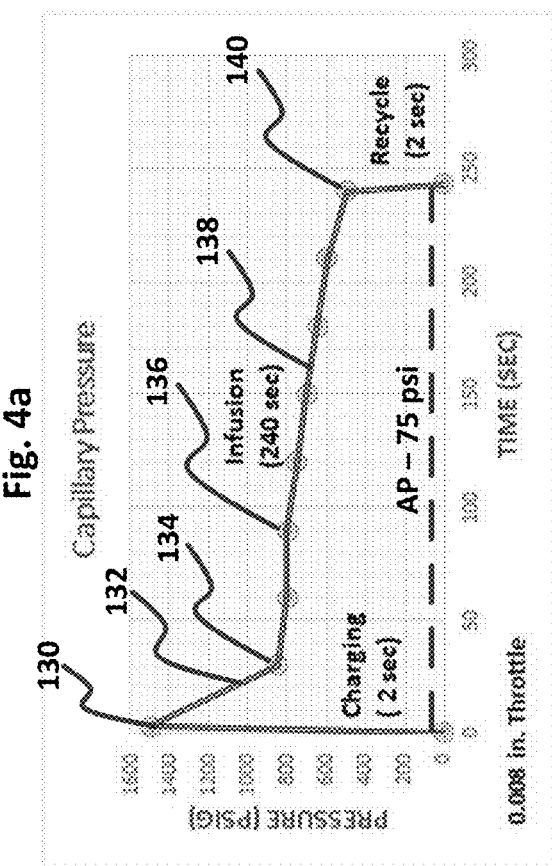
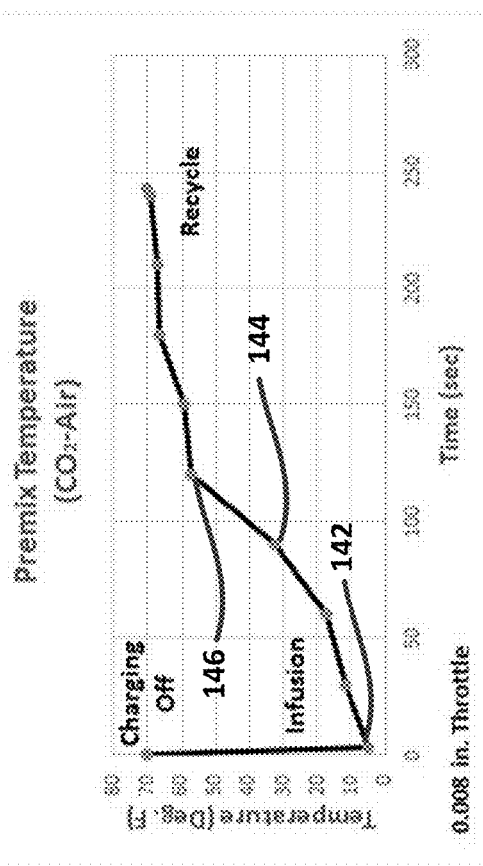

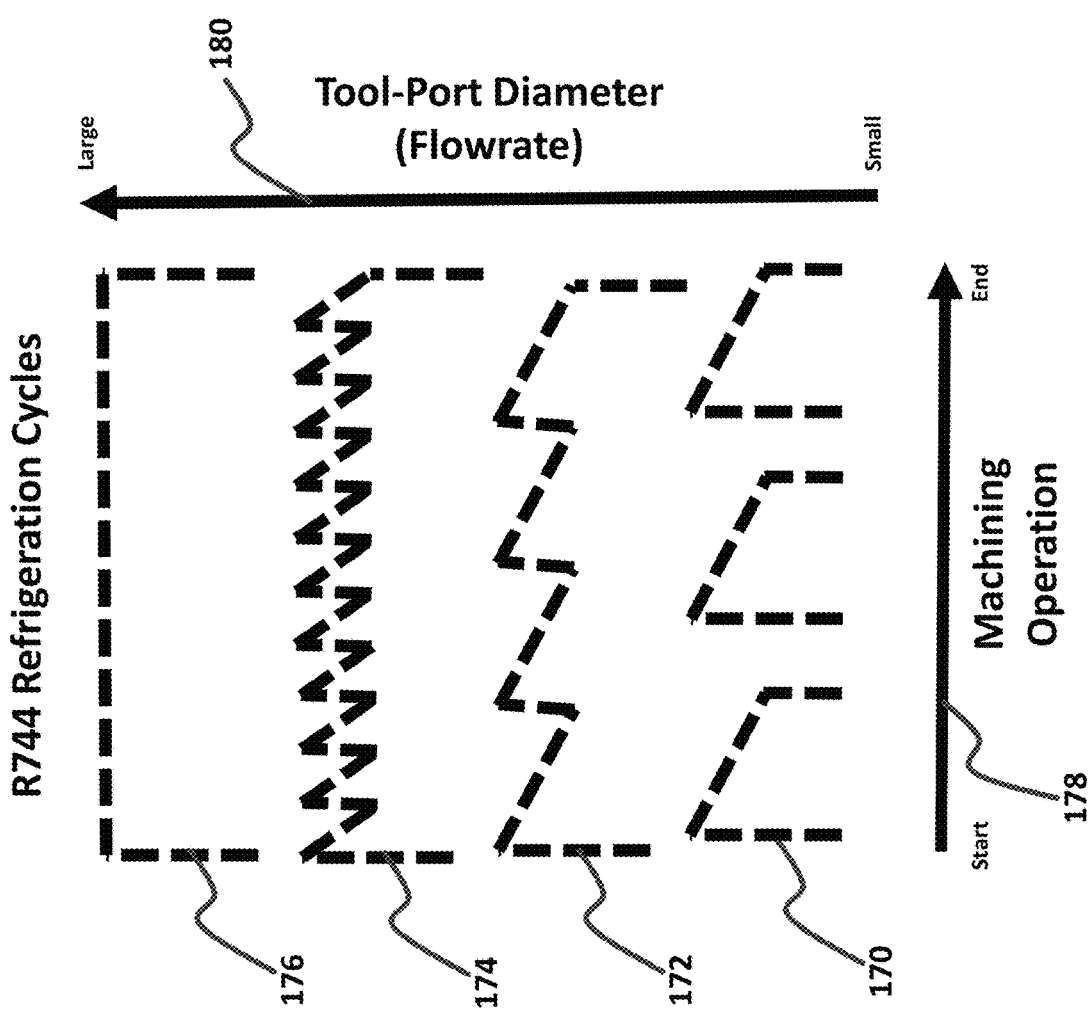

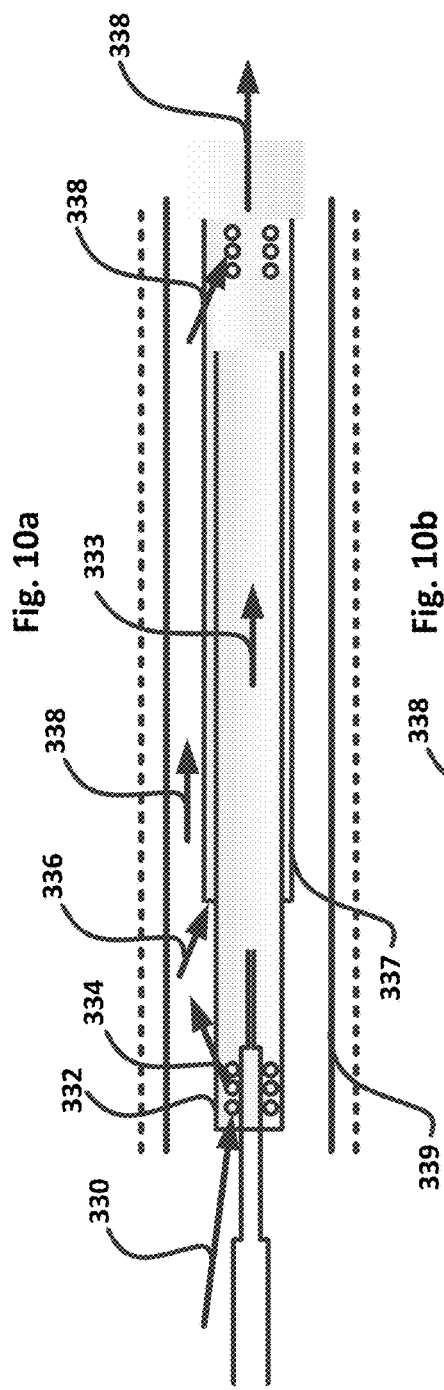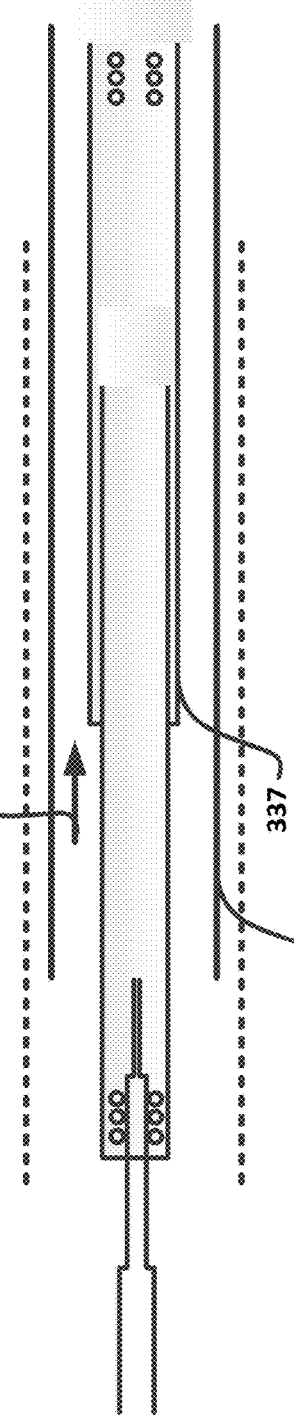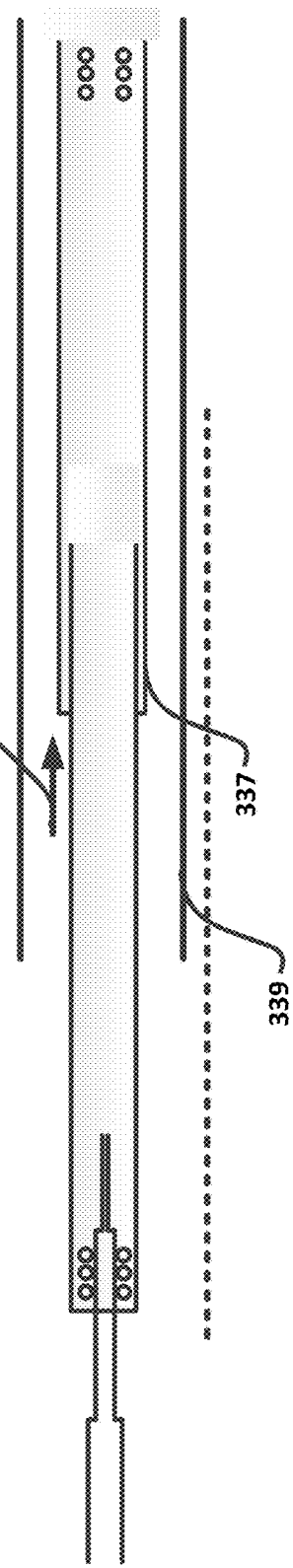

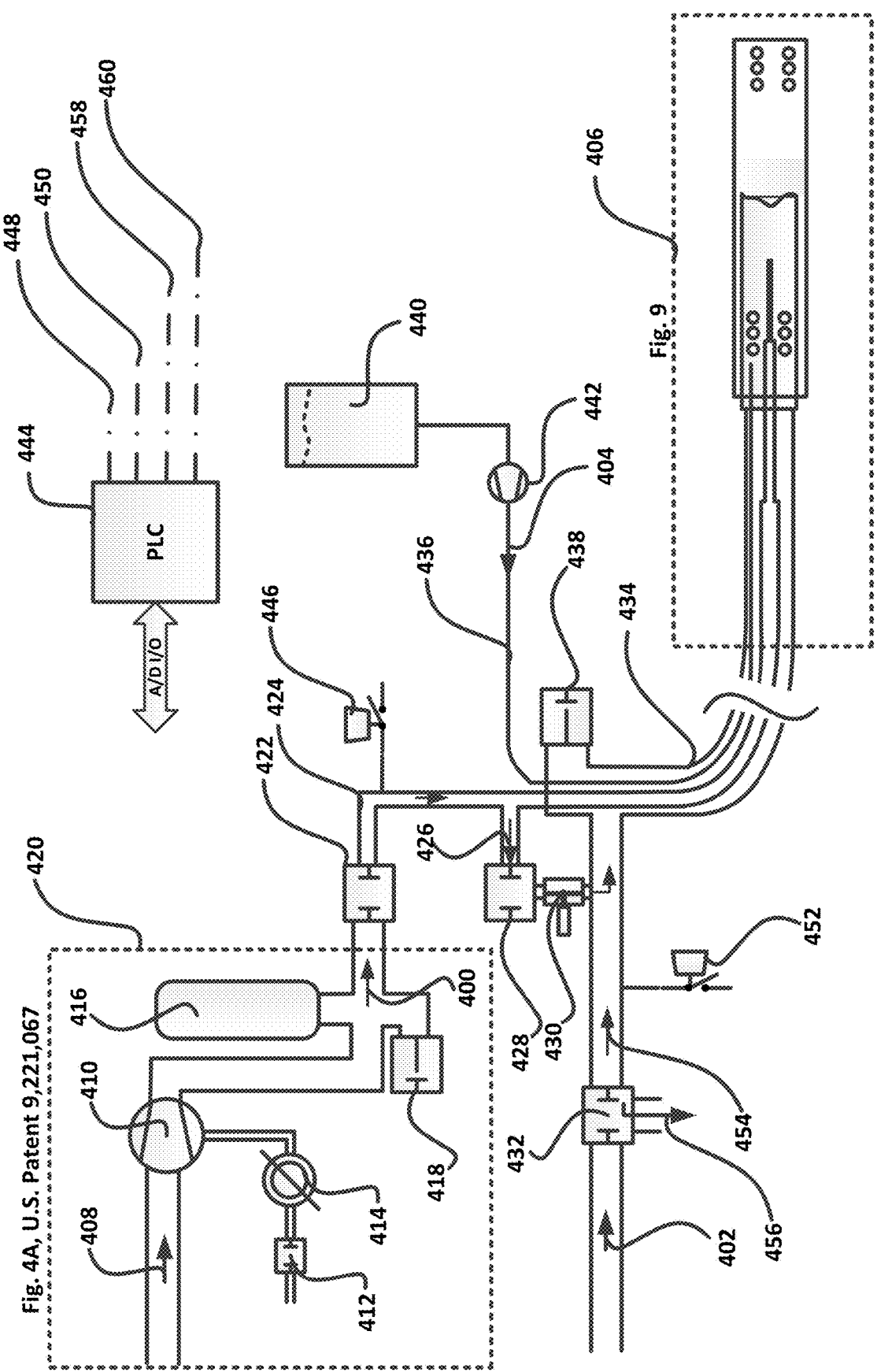

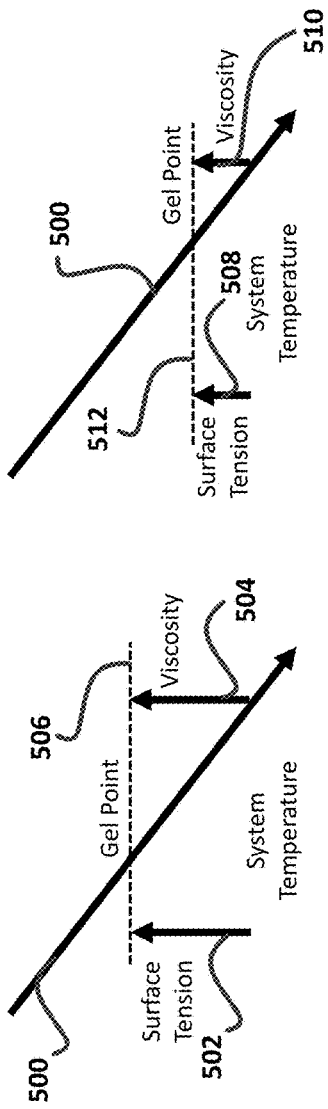
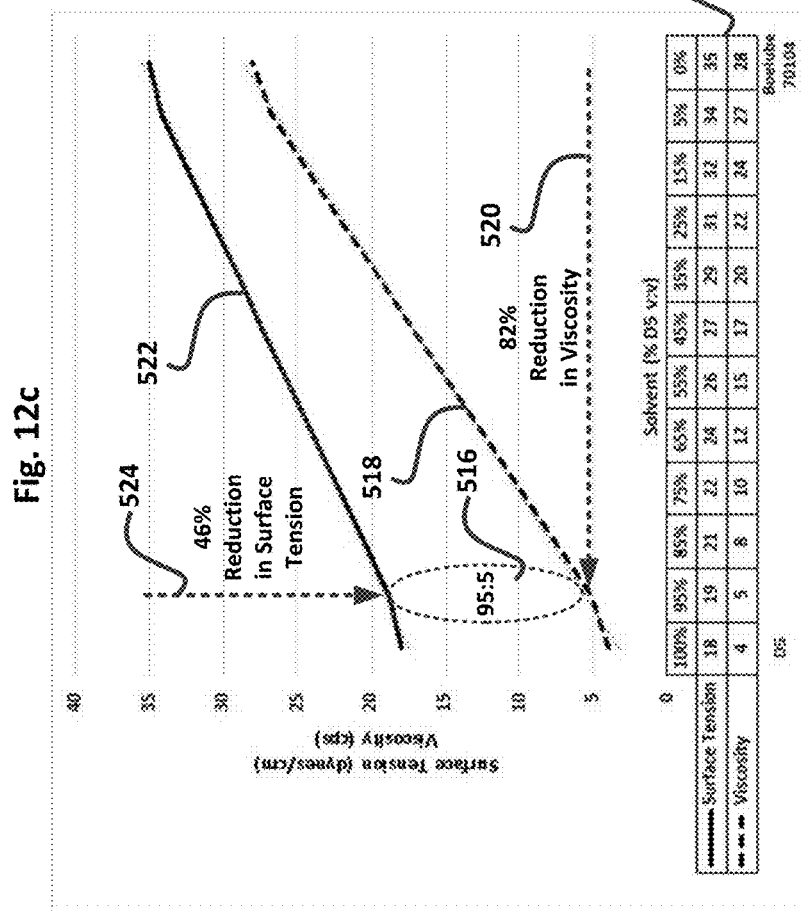

ADAPTIVE R744 MINIMUM QUANTITY COOLING LUBRICATION SYSTEM

PRIORITY CLAIM

This application claims the benefit of U.S. Provisional Patent Application 62/597,526, filed on Dec. 12, 2017, which is incorporated by reference in entirety.

BACKGROUND

A conventional method for delivering a cooling-lubricating spray during a machining process involves the application of a flooded coolant—typically an aqueous oil emulsion—under low to high pressure through a ported spindle and cutting tool. Most commercial CNC machining systems are specifically designed for flood and through-tool cooling-lubrication. However these systems present technical challenges with regards to adapting eco-friendly minimum quantity lubrication (MQL) and newer minimum quantity cooling lubrication (MQCL) schemes of the present invention. Challenges include pooling of oil droplets in transit within delivery channels and insufficient cooling provided by a carrier fluid such as air. Adapting internal MQCL spray jets within the machining system is also very challenging due to for example the inability to maintain the MQCL spray precisely pointed on the cutting zone following various tool change or part change operations.

Portable and open-air machining tools, for example portable drilling tools and knee mills, do not typically utilize flood coolant-lubricant schemes and rely heavily upon MQL and MQCL methods such as oil-air mist, cold air guns, and near-cryogenic sprays. Although easier to adapt MQCL technology to these platforms, there is a need for better MQCL technology to improve productivity and performance Moreover, adapting newer $CO_2$-based MQCL schemes (referred to herein as Refrigerant 744 (R744 MQCL)) to through-ported spindle and jet spray coolant-lubricant schemes remains challenging. For clarity, the present invention uses the term "Open System" to describe R744 MQCL spray-at-tool schemes under ambient atmospheric conditions and "Closed System" to describe R744 MQCL spray-through-spindle and tool schemes under elevated internal air pressure conditions.

Bio-based machining oils and blends, for example Boelube® 70104, a proprietary blend of Oleyl and Cetyl alcohol developed by the Boeing Company, provide excellent lubrication for machining difficult materials such as titanium and carbon fiber reinforced polymer (CFRP), and sandwiched composites of same. However these lubricants do not provide appreciable cooling capacity to manage machining heat. Poor cooling constrains the productivity of the machining process in terms of speed, feed rate, and depth of cut (DOC). To mitigate this, oil, water, surfactant and other additives are used to formulate cooling-lubricating mixtures which are applied as a flood or mist coolant-lubricant into the cutting operation. However, use of such cooling-lubricating fluid sprays, even at the levels used in conventional MQCL processes, can be very messy and clean-up of surfaces following machining operations can be very challenging particularly where water-based MQCL is used.

This is particularly illustrated in machining applications involving portable drilling tools on aircraft production lines. In such applications, preferred cooling and lubricating (cooling-lubricating) schemes for MQCL typically involve small amounts of straight oil in air, cold air, or R744 MQCL sprays, for example as taught by the first named inventor in exemplary U.S. Pat. Nos. 5,725,154, 7,451,941, and 8,926,858.

Major drawbacks associated with conventional air-oil MQCL aerosol sprays include excessive fogging (aerosol formation) of the atmosphere and limited cooling capacity of air. Current air-oil MQCL schemes employ between 20 to 150 ml, or more, of coolant-lubricant per hour, which is a large amount of machining fluid for single point cutting and drilling applications. This results in messy machining and extensive post-machining surface clean-up operations. With regards prior art developed by the first named inventor, $CO_2$-oil MQCL aerosol jet sprays have proven very effective as applied as composite jet sprays.

However conventional R744 MQCL schemes have proven quite challenging to adapt to closed systems (i.e., through-ported spindle and tool configurations), and particularly so providing consistent (and adaptive) cooling lubrication during machining operations where different cutting tools (having different sized coolant ports) and cutting conditions (experiencing changing cooling lubrication demands) occur during a machining process.

To illustrate this challenge, a through-ported machining spindle and cutting tool system can be conceptualized as a dynamic pressure reactor within which exists variable pressures and temperatures, fluids, and flow rates. The tool coolant port diameter determines the flow rate for the system (for a given pressure)—behaving as a changeable throttle for the machining fluid atmospheres introduced into the interior of the system (spindle and tool). Injecting and mixing variable amounts of $CO_2$, oils and air have proven very problematic due to a multiplicity of tool port diameters and machining conditions, for which any change alters the dynamics of the system, and in particular $CO_2$ phase transition and fluid mixing behaviors.

For example, optimal portable drilling conditions required to obtain optimal surface finishes and tool life for sandwiched composite fiber reinforced polymer (CFRP) and Titanium (Ti), termed stack-ups, requires changes in drilling speed and/or feed rate for the different materials. This capability is provided in portable drilling tools supplied by Apex Tool Group, Lexington, S.C., termed "Adaptive Drilling" technology, and is discussed under U.S. Pat. Nos. 8,277,154 and 8,317,437. However optimal machining conditions also require optimal drilling atmospheres—specifically cooling and lubrication chemistry, temperature, and pressure conditions. To date there is no effective and reliable solution for dynamically or adaptively monitoring, changing, and stabilizing R744 MQCL atmospheres within open or closed machining systems.

With reference to portable drilling machines using through-ported spindle and cutting tool systems, numerous technical constraints are experienced with conventional R744 MQCL schemes. These include the following:

1. Dry ice build-up within internal spindle or tool ports and cavities—difficult to precisely control mixing and internal pressures and temperatures during liquid $CO_2$ injection.
2. Lubricant freezing and agglomeration into large masses prior to entering tool port—clogging, poor wetting, sputtering, and flow stoppage.
3. Inconsistent and variable cooling-lubrication effects, particularly during variable machining conditions characteristic of stacked composite machining
4. Poor spreading and wetting of frozen lubricant masses into and onto critical cutting interfaces and surfaces, respectively.

5. Excessive airborne oil aerosols emitting from cutting zone generated by rapid expansion of excessive quantities of $CO_2$-oil mixtures (vaporization, sublimation, and gas expansion processes).
6. Oily residues are difficult to remove from complex machined surfaces due to high surface tension and thick film entrapment in complex surface features.

The present inventors have determined through experimentation that these problems are caused by sporadic thermal and mass transfer instabilities during internal phase transitions—$CO_2$ liquid-to-$CO_2$ solid, $CO_2$ solid-to-$CO_2$ vapor, and Oil liquid-to-Oil solid (i.e., solidification). Dry ice particle build-up, particularly when formed as a $CO_2$ particle and oil gel, is difficult to control once formed within the spindle cavity and/or cutting tool coolant ports. This condition is exacerbated under low internal spindle-tool cavity pressure and temperature conditions. Microscopic frozen oil/dry ice particles once formed lack thermal conductivity which prevents fast melting (and sublimation) and efficient flow through internal passages. Larger agglomerations of frozen and entrapped oil and $CO_2$ particles worsen the situation. As such, it is very difficult to precisely control internal phase transitions and resulting pressure, temperature, and flow instabilities using conventional means and is particularly difficult at low internal operating air pressures normally used with conventional spindle-tool R744 MQCL schemes. Dynamic changes in tool coolant port diameters, behaving as system flow throttles, and variable cutting conditions (i.e., thermal loads) exacerbate the problems thus described.

To overcome these problems, higher pressure cooling and lubricating schemes have been developed. For example, the first named inventor has developed an internal overpressure scheme (i.e., 100 psi and higher) using for example a $CO_2$ gas atmosphere within the through-ported spindle and cutting tool, into which various quantities of solid $CO_2$ and oil are injected and mixed. This approach does improve performance but does not completely resolve oil gelation problems. Moreover, high pressure conditions can be problematic and dangerous for machine tool operators, and particularly with portable drilling equipment. Still moreover, higher internal pressures require bulky high pressure lines and cause premature rotary seal wear and failure. Higher internal pressures utilize significantly more fluids (i.e., air and $CO_2$). In addition, machining chips and debris are ejected from the cutting zone at higher velocities which requires additional safety measures.

In a related approach in the prior art, high pressure liquid and supercritical $CO_2$ spray-through-spindle and tool configurations have been developed, available from Fusion Coolant Systems and described under U.S. Pat. Nos. 7,414,015 and 8,167,092. However these alternative high pressure $CO_2$ cooling-lubrication schemes are expensive to implement and use, pose high pressure hazards to workers, and are not easily adapted to through-ported machining systems without extensive redesign of coolant channel systems, spindles and tool changers.

Besides conventional oil-in-air (and cold air) MQL schemes, other conventional MQCL solutions involve the application of evaporative mixtures of highly volatile solvents (with high latent heats of vaporization) and lubricating oils to provide both cooling and lubrication actions. One such example is U.S. Pat. No. 6,326,338, which teaches the use of n-propyl bromide-oil mixtures. Major drawbacks of the '338 approach are that n-propyl bromide is toxic to humans and possesses a very low flash point of 22 deg. C., thereby not suitable for total loss systems in which the coolant-lubricant spray ultimately enters the ambient atmosphere. Frictional heating and sparking common to many machining operations poses an ignition hazard as well. In another example, Vertrel® XF is a fluorocarbon solvent offered by DuPont which can be blended with lubricating oils to provide an evaporative cooling and lubricating mixture. Although non-toxic and non-flammable, the Vertrel® process is too expensive to use in a total loss MQCL machining application. Moreover, the use of many of these conventional volatile solvent-oil cooling-lubricant schemes in productive machining applications are not permitted by manufacturers due to a combination of employee exposure and environmental quality concerns.

Finally, so-called green solvents are attractive for many industrial processes due to their low melt point, high boiling point, high solvent power, human safety, eco-friendliness, and renewability. However, most are not suitable as carriers for lubricants because of limited oil solubility, high boiling points, and/or material compatibility issues. For example, propylene carbonate (PC) is not suitable for use as an evaporative lubricant carrier solvent within a machining process due to chemical, physical, and material compatibility constraints. PC is hygroscopic and possesses a highly polar cohesion parameter of 27 $MPa^{1/2}$ with minimal bio-based oil solubility. In addition, PC possesses a very high surface tension—41 dynes/cm—which decreases wettability and requires the addition of a surfactant to lower fluid surface tension for machining applications involving for example low surface energy and non-polar carbon fiber reinforced polymer (CFRP), with a surface energy of approximately 58 dynes/cm. More significantly and with respect to the present invention, PC has a very low evaporation rate of <0.005 (Butyl Acetate=1), making it unsuitable for thin film oil deposition. PC is non-volatile and poses an entrapment issue, for example in complex machining applications involving aircraft fuselage and wing stack-ups comprising sandwiched panels of CFRP, Titanium, and Aluminum. Finally, many green solvents are not compatible with certain substrates and pose fire hazards. For example, non-toxic and generally eco-friendly solvents such as acetone and methyl ethyl ketone (MEK) are incompatible with paints, adhesives and sealants and exhibit high flammability.

As such there is a present need to provide an improved R744 MQCL system that provides a precise low-temperature cooling lubrication process absent of the constraints thus described. Moreover an improved R744 MQCL system is needed that minimizes post-machining surface clean-up operations. Finally, an improved R744 MQCL system is needed that can perform better than the conventional approaches; a system that is adaptable to a variety of machining systems and tools, particularly closed-systems such as those found in portable drilling machines; and a system that uses 100% safe and renewable cooling-lubricating chemistries in much smaller quantities than used in conventional MQCL schemes.

SUMMARY OF INVENTION

An apparatus for cooling a through-ported cutting tool, which has a through-port diameter, with a source of liquid $CO_2$ comprising: a compressed air line, which has a compressed air inlet and establishes a flow of compressed air to the cutting tool, and the compressed air line has a first $CO_2$ injection capillary segment and a second $CO_2$ injection capillary segment; the first and the second $CO_2$ injection capillary segments are interconnected to the same source of liquid $CO_2$; the first $CO_2$ injection capillary segment has a first high pressure valve, and the second $CO_2$ injection capillary segment has a second high pressure valve, and the source of liquid $CO_2$ has a third high pressure valve; the first $CO_2$ injection capillary segment has a first throttle, and the second $CO_2$ injection capillary segment has a second throttle; the first throttle is smaller than the second throttle; the first $CO_2$ injection capillary segment terminates near the cutting tool; the second $CO_2$ injection capillary segment terminates near the compressed air inlet; whereby the third valve and first valve are opened, and an amount of liquid $CO_2$ charges the first capillary segment; the third valve is closed, and the liquid $CO_2$ in the first $CO_2$ injection capillary segment is mixed into the compressed air and near the cutting tool to form a first cooling fluid; the second valve is opened, and residual $CO_2$ in the first capillary segment flows through the second $CO_2$ injection capillary segment, into the compressed air and near the compressed air inlet to form a second cooling fluid; flowing said first and the second cooling fluids through said cutting tool; and the cutting tool is maintained within a certain temperature range.

This invention presents one preferred embodiment as an apparatus for cooling a through-ported cutting tool, which has a through-port diameter, with a source of liquid $CO_2$ comprising: a compressed air line, which can have a compressed air inlet and can establish a flow of compressed air to the cutting tool, and the compressed air line can have a first $CO_2$ injection capillary segment and a second $CO_2$ injection capillary segment; the first and the second $CO_2$ injection capillary segments can access, connect or interconnect to the same source of liquid $CO_2$; each $CO_2$ injection capillary segment can have a high pressure valve or regulator and a throttle, and the source of liquid $CO_2$ can have a third high pressure valve or regulator; the first throttle can be smaller than the second throttle; the first $CO_2$ injection capillary segment terminates, ends or releases near the cutting tool; the second $CO_2$ injection capillary segment terminates, ends or releases near the compressed air inlet; whereby the third valve and first valve are opened, and an amount of liquid $CO_2$, which corresponds to the diameter of the through-port of the cutting tool, charges the first $CO_2$ injection capillary segment with liquid $CO_2$ at a predetermined charging pressure; then, the third valve is closed, and the liquid $CO_2$ in the first $CO_2$ injection capillary segment is mixed into the compressed air near the cutting tool for a predetermined period of time and to predetermined recycle pressure to form a first cooling fluid; the second valve is opened and residual $CO_2$ in the first $CO_2$ injection capillary segment flows through the second $CO_2$ injection capillary segment, into the compressed air and near the compressed air inlet to form a second cooling fluid; flowing said first and the second cooling fluids through said cutting tool; and the cutting tool is maintained within a certain temperature range.

The compressed air pressure can be between 30 psi and 500 psi; or the compressed air can flow between 0.5 and 20 scfm; the liquid $CO_2$ can be injected in the first $CO_2$ injection capillary segment from a charging pressure of between 900 and 5000 psi and to a recycle pressure of between 400 and 750 psi. In another embodiment, the liquid $CO_2$ can be injected into the first $CO_2$ injection capillary segment at a flowrate of between 0.1 lbs./hour and 20 lbs./hour.

The liquid $CO_2$ can be injected into the second $CO_2$ injection capillary segment from a pressure of between 500 and 750 psi and to a pressure, which is equal to the compressed air pressure; a small amount of liquid lubricant can be added, introduced or injected into the second cooling fluid; the liquid lubricant can comprise: synthetic oil, semi-synthetic oil, mineral oil, bio-based oil, polyalkylene glycol, polyolester or alcohol; the liquid lubricant can be added, introduced or injected into the second cooling fluid at a flowrate of between 10 ml/hour and 250 ml/hour; the liquid lubricant can be a fractional solute of a volatile carrier solvent to form a dilute liquid lubricant fluid; the volatile carrier solvent can comprise a cyclic volatile methyl siloxane, alcohol, ketone or alkene; the liquid lubricant can be co-injected and mixed with the second cooling fluid using a telescoping lance.

This apparatus can be controlled automatically using a PLC (programmable logic controller), digital timers or pressure switches; the apparatus can be controlled using cutting force data; the first or the second throttles can be adjustable.

An apparatus for cooling a through-ported cutting tool, which has a through-port diameter, with a source of liquid $CO_2$ comprising: a compressed air line, which has a compressed air inlet and establishes a flow of compressed air to the cutting tool, and the compressed air line has a first $CO_2$ injection capillary segment and a second $CO_2$ injection capillary segment; the first and the second $CO_2$ injection capillary segments are interconnected to the same source of liquid $CO_2$; the first $CO_2$ injection capillary segment has a first high pressure valve, and the second $CO_2$ injection capillary segment has a second high pressure valve, and the source of liquid $CO_2$ has a third high pressure valve; the first $CO_2$ injection capillary segment has a first throttle, and the second $CO_2$ injection capillary segment has a second throttle; the first throttle is smaller than the second throttle; the first $CO_2$ injection capillary segment terminates near the cutting tool; the second $CO_2$ injection capillary segment terminates near the compressed air inlet; whereby the third valve and first valve are opened, and an amount of liquid $CO_2$, which corresponds to the diameter of the through-port of the cutting tool, charges the first $CO_2$ injection capillary segment with liquid $CO_2$ at a predetermined charging pressure; the third valve is closed and the liquid $CO_2$ in the first $CO_2$ injection capillary segment is mixed into the compressed air near the cutting tool for a predetermined period of time and to predetermined recycle pressure to form a first cooling fluid; the second valve is opened and residual $CO_2$ in the first $CO_2$ injection capillary segment flows through the second $CO_2$ injection capillary segment, into the compressed air and near the compressed air inlet to form a second cooling fluid; the first, second, and third valves are controlled using digital timers; the second throttle is adjustable; flowing said first and second cooling fluids through said cutting tool; and the cutting tool is maintained within a certain temperature range.

The present invention addresses numerous constraints of conventional MQCL schemes, including R744-air-oil, air/cold air-oil, and solvent-oil aerosol sprays. The present invention is an adaptable R744 MQCL system that produces ultra-lean cooling, cleaning, and lubricating atmospheres for any variety of through-ported spindle-tool systems as well as atmospheric jet spray applications. The present invention comprises the following exemplary embodiments and aspects.

A first embodiment of the present invention is a process and apparatus—a novel R744 refrigeration apparatus and process—for providing precise cooling lubrication fluids for a through-ported cutting tool affixed to a through-ported spindle with drive motor means. Exemplary aspects of this first embodiment include the following:

Open cycle mixed-fluid R744 refrigeration apparatus and process using micronized $CO_2$ particles and fluids (liquid and gaseous $CO_2$) mixed with compressed air.

Dual throttle control—fixed throttle with pneumatic adjustment for primary cooling a portion of compressed air to form a cold $CO_2$-air premix fluid and a variable throttle with mechanical adjustment for secondary pre-cooling and $CO_2$-enrichment of compressed air supply for same.

Micronized supersaturated $CO_2$ injection—adapted in part from a co-pending application: U.S. Pat. No. 9,221,067, $CO_2$ Composite Spray Method and Apparatus, Jackson D. et al (Notice of Allowance Aug. 20, 2015).

Numerous refrigeration cycle possibilities and a range of R744 cooling capacities.

Optional coaxial telescoping (expanding) premix chamber design which follows spindle movement during cutting operations and isolates primary cooling processes from internal spindle surfaces.

The first embodiment of the present invention utilizes a novel R744 refrigeration apparatus to produce adjustably cool to very cold cooling-lubrication fluids for machining applications. The exemplary R744 refrigerator described herein comprises a coaxial refrigeration tube coupled to a through-ported spindle using a through-ported rotary union. Dry compressed air simultaneously (and isobarically) enters and flows through an inner coaxial refrigeration premix tube and through an outer spindle cavity to form a triaxial coolant-lubricant injection and mixing assembly. Supersaturated $CO_2$ is selectively injected into the refrigeration premix tube using a micro-capillary throttle contained same to produce a micronized fluid spray which mixes with a portion of the compressed air flowing through the system as described. The compressed air also (optionally) contains one or more trace lubricant additives, including a novel low-temperature composition described under the second embodiment herein. As described, two isobaric mixed-fluid flow streams are produced and maintained within a spindle—(1) an outer hot fluid stream (Air-Additive) flowing coaxially about an inner cold fluid stream (Air-$CO_2$) flowing within an inner coaxial refrigeration premix tube. Supersaturated $CO_2$ is selectively injected into the inner coaxial refrigeration premix tube at a predetermined distance from its exit which allows the micronized fluids to mix efficiently with a portion of compressed air flowing therein to form a very cold Air-$CO_2$ premix fluid stream. The injection distance determines the $CO_2$-air flow stream premixing period. During this process a small amount of heat is also removed from the outer compressed air-additive fluid flow stream through direct heat exchange with the outer surface of the inner coaxial refrigeration tube. To mitigate heat exchange the coaxial refrigeration premix tube may be constructed of a thermal-insulating polymer, the outer metal surface may be insulated using a suitable polymer sleeve (i.e., shrink tubing) or using a secondary sliding-telescoping sleeve which moves in relation to spindle movement using air power or a spring tensioner. These optional aspects conserve premix fluid heat capacity for downstream injection into the tool coolant ports and mitigate direct heat exchange with the spindle body—all of which increases available cooling capacity for the cutting tool and cutting zone. Finally, coaxial refrigeration tube premix fluid and spindle air-additive fluid are turbulently mixed within a region just prior to the cutting tool ports wherein the R744 MQCL fluid mixture exchanges heat (and active chemistry) with the cutting tool and cutting zone upon discharge from the cutting tool through both convective cooling and radiative cooling ($CO_2$-enrichment provides improved IR heat absorption).

The exemplary R744 refrigeration apparatus utilizes a novel dual throttle, mixed-fluid and open-cycle R744 refrigeration process comprising three stages—Stage 1—Charging, Stage 2—Infusion, and Stage 3—Release-Recycle, described as follows. During Stage 1 supersaturated $CO_2$ is injected to a predetermined charging pressure (CP) between 1000 psi and 5000 psi, or higher for a predetermined charging time (CT) of between a few seconds or longer (a frequency based cooling cycle) and for the entire machining operation (continuous cycle) to provide the required primary refrigeration. During Stage 2 the charged fluid is infused (at a frequency or continuously) through a primary fixed micro-throttle having an internal diameter of between 25 microns and 0.015 inches and a length between 6 inches and 36 inches in length, during which micronized $CO_2$ fluid and particles are precisely mixed with an isolated and coaxial portion of the internal propellant air stream under isobaric compressed air conditions to form a subcooled premix which is then turbulently mixed with another portion of compressed air and lubricant additives. Temperatures of the premix fluid decrease from 20 deg. C. to as low as −30 deg. C. depending upon the fixed throttle size used, charging pressure, and charging-infusion frequency. Finally, Stage 3 terminates the primary refrigeration cycle by rapidly recycling residual high pressure $CO_2$ gas coolant into the upstream compressed air through a second variably-adjusted throttle. The majority of the cooling capacity of the exemplary R744 refrigerator is delivered through heats of vaporization and sublimation using a first micro-throttle. Toward the end of the primary refrigeration cycle residual high pressure $CO_2$ gas can provide additional Joule Thomson (JT) expansion cooling capacity due to a relatively large pressure gradient between the injection throttle and the internal spindle fluid pressures. Residual high pressure $CO_2$ gas is a useful cooling agent (convective and radiative cooling), possessing a very large JT coefficient (5× greater than compressed air) and an excellent infrared (IR) heat absorption (radiative cooling) capability for cutting zone cooling (i.e., Titanium machining). By contrast, cool compressed air convectively removes heat from hot surfaces but does not absorb the significant IR heat emanating from freshly cut surfaces. However, as the coolant pressure decreases during the infusion cycle to below 750 psi (i.e., vapor phase) there is an appreciable loss of cooling efficiency as it relates to infusion time using the first micro-throttle (i.e., primary cooling throttle). This point in the present refrigeration cycle is termed herein as the Release-Recycle Pressure (RP). Based on a predetermined RP, the exemplary R744 refrigerator releases or preferably recycles this high pressure gaseous coolant (referred to herein as spent coolant) rapidly into the propellant air (i.e., recycle) or into ambient atmosphere (i.e., release) through a second and larger adjustable or macro-throttle, following which there is an inter-cycle dwell time (DT). Recycling the $CO_2$ gas precools the incoming compressed air and increases its radiative cooling properties (vis-à-vis $CO_2$ enrichment). The RP ranges between 400 psi and 800 psi and the DT ranges between 0 seconds (immediate recycle) to 300 seconds or more (delayed recycle/release or release to ambient pressure). Finally, the refrigeration cycle thus described is repeated for one or more cycles during a machining operation. A variety of refrigeration cycles (and cooling capacities) can be implemented to optimize cooling (and lubrication) for a particular machining operation. Exemplary refrigeration cycles include:

1. Low Frequency Cycles
2. Medium Frequency Cycles
3. High Frequency Cycles
4. Continuous Cycles A general relationship exists between cutting tool-port diameter and optimal refrigeration cycle. Lower frequency refrigeration cycles work well for small cutting tools with small coolant port diameters. Higher frequency or continuous refrigeration cycles work well for larger cutting tools and coolant port diameters. For example, a continuous injection cycle (i.e., maximum cooling power) would generally not be useful for small cutting tool-port diameters as this could possibly introduce excessive cooling—resulting in icing ($CO_2$/water ice formation), additive gelation, and/or spindle overpressure conditions (internal spindle-tool cavity pressure rises above incoming propellant air pressure).

A second embodiment of the present invention is a novel ultra-minimum quantity superspreading lubrication composition for use at low application temperatures. Exemplary aspects of this second embodiment include the following:

- A novel superspreading lubricant composition for low-temperature R744 MQCL.
- Multiple MQCL formulations having different lubricity levels.
- Ultra-low quantity lubrication usage—as low as 2 ml lubricant per hour.
- Superspreading thin film formation—8× to 20× higher lubricated surface area.
- Increased oil and $CO_2$ cooling and lubrication efficiency.
- Easier residue clean-up.
- Compositions have a very high solubility for oxygenated additives and serve as a vehicle for oxygenation processes, for example use in a co-pending U.S. application Ser. No. 13/733,880, Method for Forming and Applying an Oxygenated Fluid, Jackson D.
- Compositions are 100% biodegradable and use renewable resources.
- Compositions are non-toxic, non-corrosive, and non-flammable
- Compositions are compatible with all common substrates—metals, CFRP, painted surfaces, and sealants.

While developing a low temperature lubricant composition, it has been discovered by the present inventors that volatile methyl siloxane (VMS) solvent, and preferably a cyclic VMS called decamethylcyclopentasiloxane (D5), containing a fractional amount of a polar bio-based lubricant (solute), for example Boelube® 70104, produces a unique and new key performance property—superspreading behavior. Various compositions of D5 and Boelube® lubricant ranging between 95:5 (v:v) and 50:50 (v:v), respectively, have been developed and tested. All compositions superspread on both metal and polymer surfaces—depositing increasing thicknesses of Boelube® lubricating films following evaporation of the D5 carrier solvent with increasing concentration of Boelube® solute in the D5 carrier solvent. Superspreading behavior has been observed for exemplary mixtures of the present invention on both polar aluminum surfaces and non-polar carbon fiber reinforced polymer (CFRP) surfaces. The R744 MQCL composition of the present invention is capable of very low-temperature service with adaptable cooling-lubrication during application.

Exemplary compositions of the present embodiment employ only a fraction of the lubricating oil typically used in conventional MQL aerosols—enabling much lower lubricant usage levels of between 1-25 ml Oil/hour as compared to conventional MQL usage levels, typically between 50-150 ml Oil/hour. Preferred high-boiling and non-volatile polar lubricants for use in the present embodiment include high-boiling and high molecular weight alcohols such as Oleyl and Cetyl Alcohol, for example as used in an exemplary benchmark lubricant Boelube® 70104, as well as unsaturated bio-esters such as Oleic acid. However other lubricating solutes such as synthetic oils, semi-synthetic oils and mineral oils may also be used in the present invention. Moreover, the cyclic VMS carrier solvent significantly reduces the surface tension and viscosity of the lubricating additives—lowering the gel point and improving their flow characteristics under low temperature conditions. As the VMS solvent carrier separates (evaporates) from the lubricant additives during deposition the surface tension and viscosity of the lubricant additives increase and return to their original levels which accommodates the higher temperature and friction-reducing performance demands of the cutting operation, dynamically adapting to the machining process. Finally, a range of lubricity levels (and thin film thicknesses) can be formulated as needed for a particular machining application.

Another beneficial characteristic of the preferred cyclic VMS carrier solvent of the present embodiment is its high oxygen solubility and resistance to ozone oxidation. As such the preferred VMS carrier solvents of the present invention are useful diluents and mediums for oxygenation processes described in a co-pending invention by the first named inventor and described under U.S. patent application Ser. No. 13/733,880, Method for Forming and Applying an Oxygenated Fluid, which can be used in cooperation with the present invention.

This second embodiment is particularly directed to resolving icing and clogging problems associated with a through-ported spindle-tool system at very low temperatures using R744 or cold air. However the present embodiment may also be used as an ultra-lean MQCL agent in an open system jet spray. In addition, VMS (D5) may be injected directly into liquid carbon dioxide and expanded to form a cold $CO_2$-D5 fluid composition which is then mixed with compressed air carrying an oil additive to form a superspreading MQCL cooling-lubricating fluid.

Various cyclic VMS chemistries may be used in the present invention, for example dodecamethylcyclohexasiloxane (D6) and blends of D5 and D6, however D5 is particularly advantageous and preferred due to its unique combination of environmental, health, worker safety, availability, cost and physical properties such as a very low melt point, higher volatility and non-flammability. In addition, D5 is a renewable, environmentally safe, and worker-safe compound suitable for precision cleaning—all of which are very important aspects in machining applications. Moreover, D5 is an EPA SNAP-Approved solvent substitute and is not considered a volatile organic compound (VOC), which exempts the mixtures of the present invention from burdensome regulatory constraints.

An adaptive $CO_2$-based (Refrigerant R744) minimum quantity cooling lubrication (MQCL) system for through-spindle and through-tool machining processes. The present invention employs a dual-throttle, mixed fluid and open cycle cooling process and apparatus. Moreover, a superspreading lubricant composition is disclosed for use in the present invention as well as conventional minimum quantity lubrication (MQL) processes.

BRIEF DESCRIPTION OF THE DRAWINGS

Other aspects and advantages of the present invention will be apparent to those skilled in the art from the following further description of various examples and preferred embodiments of the invention, and by reference to the following figures.

FIG. 1b—Graph and discussion of operational constraints associated with the conventional R744 MQCL system of FIG. 1a.

FIG. 4a—Graph showing an exemplary change in charging and infusion (capillary) pressure over time for a 1500 psi injection using a 0.008 inch fixed throttle.

FIG. 4b—Graph showing the change in premix ($CO_2$-Air) temperature within the premix tube for the R744 refrigeration cycle of FIG. 4a.

FIG. 5—Graph showing the different R744 MQCL refrigeration cycles used in the present invention.

FIG. 8b—Schematic and discussion of various components the exemplary R744 refrigerated cooling lubrication system adapted to a portable drilling machine described under FIG. 8a.

FIGS. 10a, 10b and 10c—Schematics showing fluid flow through the exemplary perforated premix tube and sequential movement of the optional telescoping premix tube sleeve assembly described under FIG. 9.

FIG. 11—Schematic of exemplary coolant and lubricant fluids generation and delivery system.

FIG. 12a—Graph showing the relationship between low fluid temperature, increasing viscosity and surface tension, and gel point for conventional (neat) lubricants.

FIG. 12b—Graph showing the requirement for lower apparent viscosity and surface tension at a lower temperature for a lower gel point temperature.

FIG. 12c—Graph showing calculated surface tension and viscosity values for a range of VMS (D5) and Boelube® 70104 compositions.

DETAILED DESCRIPTION OF INVENTION

Figure 1A:
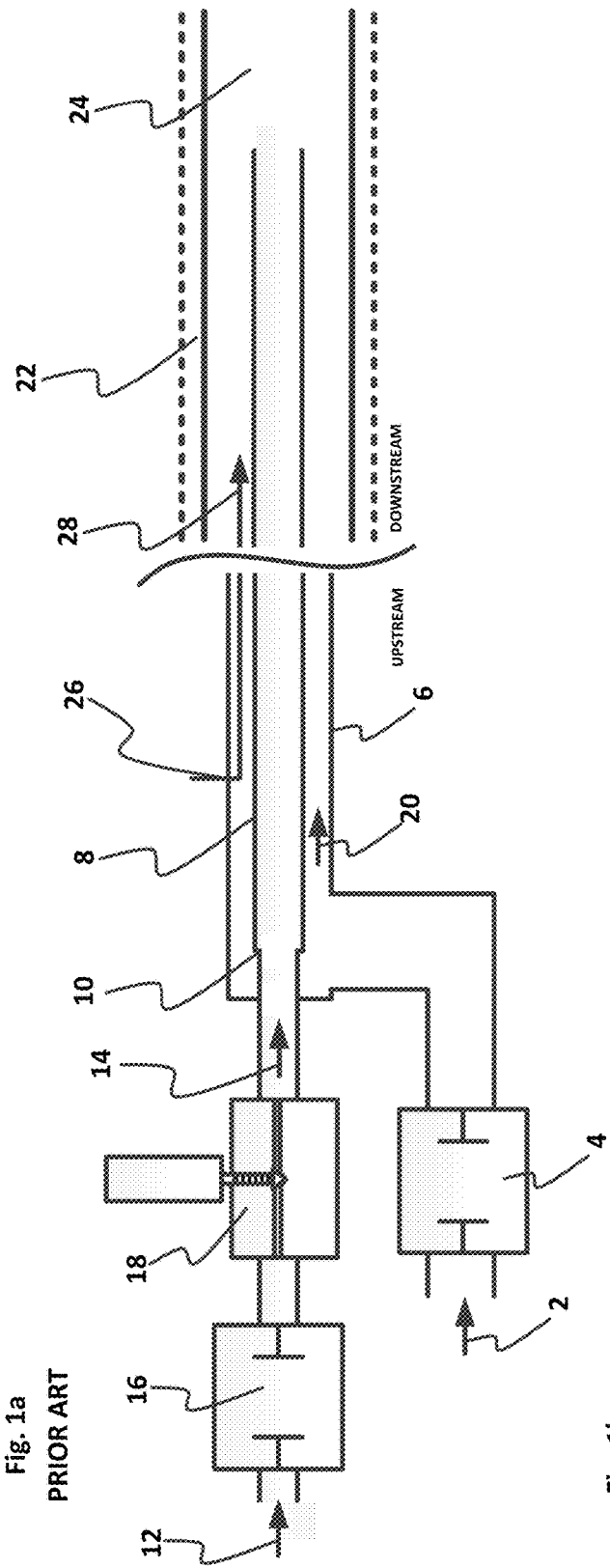
FIG. 1a—Schematic and description of an exemplary conventional R744 MQCL system.

FIG. 1a is a schematic of an exemplary conventional R744 MQCL system.

Referring to FIG. 1a, an exemplary prior art cooling lubrication systems developed by the first named inventor of the present invention are described in U.S. Pat. Nos. 5,725,154, 7,451,941, and 8,926,858. In its basic implementation, pressure- and temperature-regulated compressed air (2) at a pressure of between 30 and 150 psi and a temperature of between 10 degrees C. and 25 degrees C. is flowed through an automated valve (4) and into a coaxial delivery line segment (6) which contains a centrally positioned polyethertherketone (PEEK) capillary tube (8) for $CO_2$ fluids delivery, the coaxial tube-in-tube segment thus described may be between 6 inches to 20 feet long, or more. The capillary tube segment (8) typically uses an inside diameter ranging between 0.020 inches to 0.080 inches, or may be stepped (10)—increasing in inside diameter as it traverses the coaxial segment (6) to assist with $CO_2$ particle growth. A supply of saturated liquid $CO_2$ (12), ranging in pressure and temperature between 700 and 850 psi and 10 and 25 degrees C., respectively, is flowed into and through the capillary tube (14) through an automated valve (16) and mechanical throttling valve (18), and flows through the capillary tube as a cold gas-particle aerosol with an air propellant gas also flowing (20) coaxially about the capillary tube. Said mechanical throttling valve (18) is typically a precision 18-turn needle valve, which may be automated, to vary the $CO_2$ fluid injection (coolant) flow rate. The coaxial $CO_2$-Air delivery line thus described is integrated with a through-spindle/tool system (22), within which the $CO_2$ is injected into and mixed with the coaxial propellant air to form a cold cooling gas stream (24) which then enters a through-ported tool (not shown). Moreover, the exemplary prior art system may use an auxiliary coaxial additive capillary tube (26) for injecting lubricant droplets (28) into the cold $CO_2$-Air mixture (24) within the through-ported spindle (22). Finally, various amounts of $CO_2$, compressed air, and lubricant additive are mixed within the machining spindle (22) to produce cooling lubricating fluid compositions having various cooling capacities. In the prior art, the adjustable throttle is used at the large distance upstream from the mixing point (spindle cavity), which makes it very difficult to precisely deliver uniform R744 MQCL compositions. Liquid $CO_2$ boils through the throttle (18) and into the capillary tube (8) at variable flow rates (depending upon input fluid pressure and temperature) to form variously-sized and amounts of $CO_2$ dry ice particles and cold $CO_2$ gas, respectively. The coolant mixture (14) traverses relatively large distances through the coaxial segment (6) before air-additive mixing (24) within the internal through-ported cavity of the spindle (22) and then finally into a ported cutting tool (not shown). Besides $CO_2$ coolant form factor control challenges, losses in cooling capacity are experienced during the delivery process to the spindle, described below.

Figure 1B:
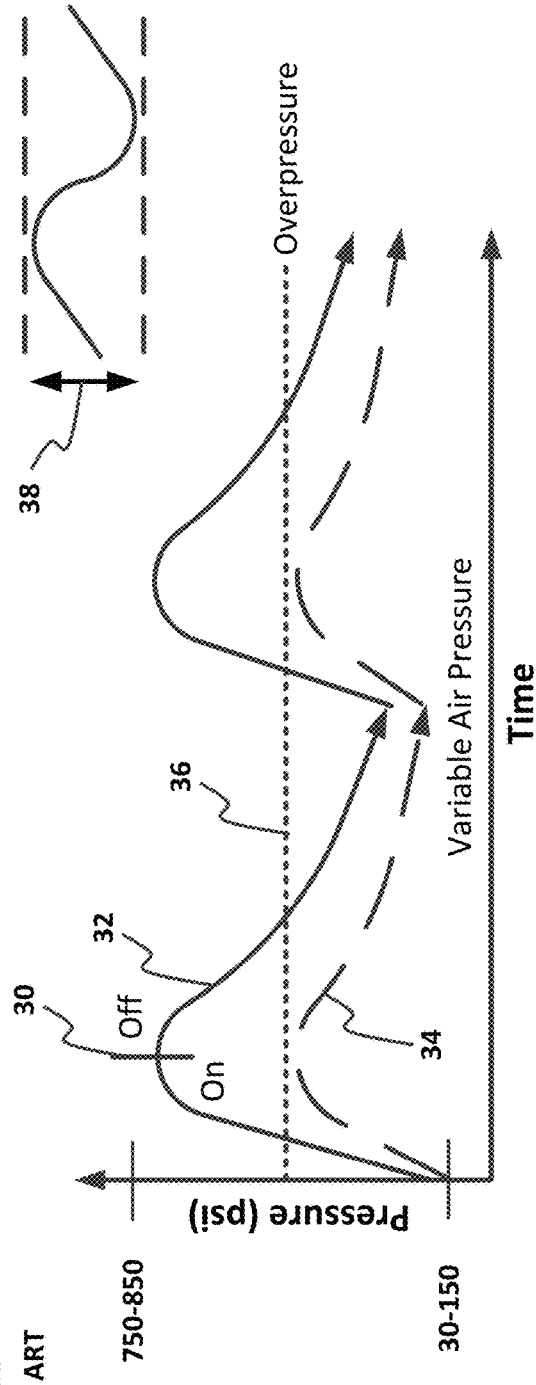

Having thus described a prior art system developed by the first named inventor of the present invention which has been adapted to a through-ported machining spindle and cutting tool, FIG. 1b is a graph describing operational constraints associated with the conventional R744 MQCL system of FIG. 1a. Now referring to FIG. 1b, during operation of the prior art system several problems arise. During the injection of $CO_2$ fluids using a pulsing on/off valve operation (30), large fluctuations in $CO_2$ capillary pressure (32) are experienced. This is due to relatively large masses of injected $CO_2$ particles using the prior art, which requires longer mixing time (and sublimation time) with the compressed air fluid stream constrained by the relatively low mixing volumes within and high flowrates through a closed spindle-tool system. Internal pressure rise is a result of particle sublimation and fluid expansion (i.e., solid-liquid-gas) which can increase internal fluid volumes by as much as 800x. This relatively large volume of cold $CO_2$ fluids enter the spindle cavity (FIG. 1a (24)) under a relatively low internal spindle air pressure typically between 60 and 100 psi with relatively small internal through-port volumes and high flowrates throttled by the entrance port into the cutting tool. This results to mild to severe compressed air pressure and flow rate fluctuations during a machining cycle. One method developed by the first named inventor to suppress the internal pressure fluctuations is to increase the compressed air pressure into the spindle to 100 psi or higher—creating an overpressure condition (36)—which dampers the incoming $CO_2$ fluid pressure fluctuations. However, higher spindle air pressures increase wear rates on rotary unions and seals, consume more process fluids (air/$CO_2$), and increase pressure-related hazards such as machining chip and particle velocities. Another problem related to $CO_2$-Air mixing pressure fluctuations is mixing temperature fluctuations. Fluid mixing pressure variability results in mixing temperature variability (38).

Problems experienced with temperature and pressure fluctuations include inconsistent MQCL compositions, flow fluctuations, icing, port clogging and sputtering, and lubricant gelling—all of which produces variable cutting temperatures, cutter life, surface finishes. Moreover, for complex machining applications involving for example multiple and different types of cutting tools (with different sized coolant ports), cutting processes (with different cooling lubricant requirements), and/or machining applications involving multiple and different workpieces (with different machining speeds/feed rates and cooling lubricant demands)—the prior art cannot easily adapt R744 MQCL conditions on-the-fly to meet the new cooling lubricant flow, chemistry, thermal demands without the significant process control and variability constraints thus described. For example, the capillary feed segment (FIG. 1a (8)) may have to be changed (i.e., to provide a smaller or larger internal diameter) to adapt to new machining process conditions. Finally, a particularly challenging application for conventional R744 MQCL processes involves through-hole drilling of thick sandwiched composites of Aluminum, Titanium, and CFRP using a small diameter through-ported tungsten carbide drill. This is the subject of experimental application of the present invention, described herein.

Having thus described the prior art, it is understood that a present need exists for an improved R744 MQCL refrigeration apparatus and process that provides precision cooling lubrication generation, application and delivery through a closed machining system comprising a through-ported spindle and cutting tool.

The present invention uniquely resolves known constraints associated with conventional R744 MQCL schemes using a comprehensive approach involving two significant embodiments: (1) an improved R744 refrigeration system—including both apparatus and process, and (2) an improved R744 MQCL lubricant additive composition—providing significantly improved physicochemical performance properties under low temperature mixing and application conditions. Both embodiments and aspects related to same are discussed in detail in the following sections.

Figure 1C:
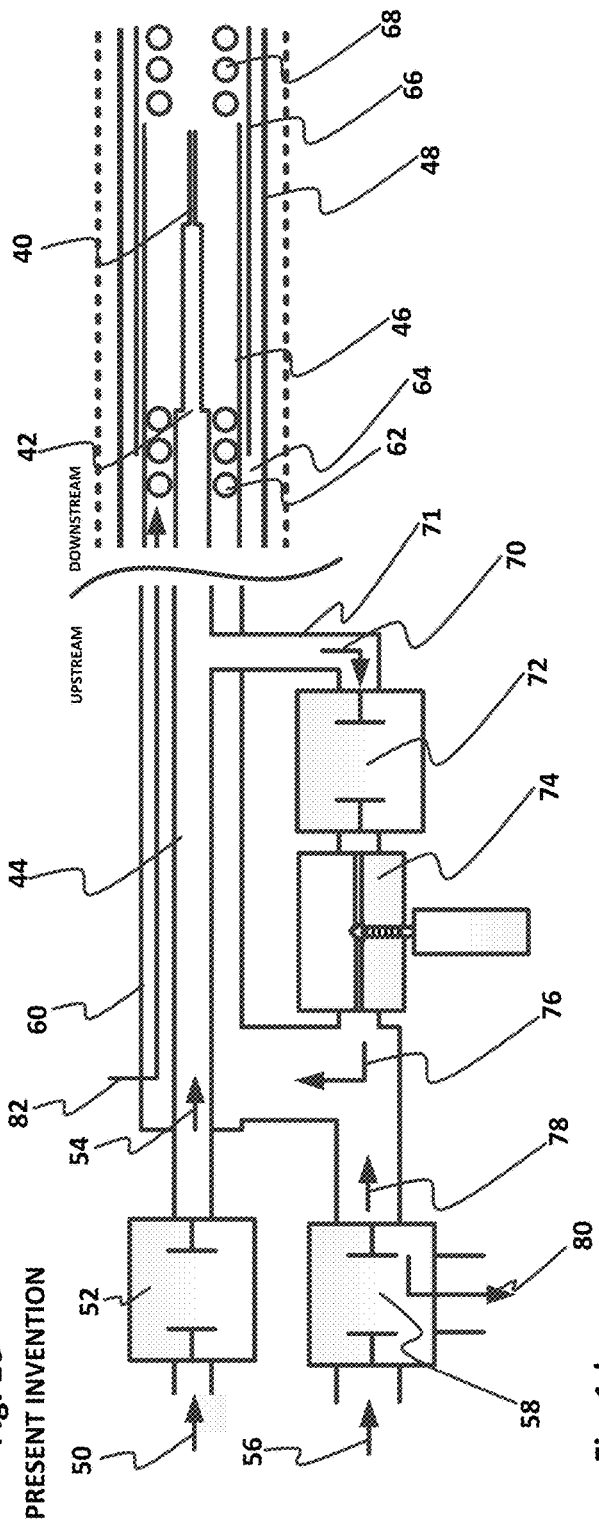
FIG. 1c—Schematic and description of an exemplary aspects of the improved R744 MQCL system of the present invention.

FIG. 1c is a schematic describing exemplary aspects of the improved R744 MQCL system of the present invention. Referring to FIG. 1c, the present invention utilizes (in part) a recently patented $CO_2$ micronizing process developed by the first named inventor, which is described in detail in U.S. Pat. No. 9,221,067, U.S. Patent No. '067, $CO_2$ Composite Spray Method and Apparatus, Jackson D. et al.

The supersaturated $CO_2$ injection apparatus and process of FIG. 4a, U.S. Patent No. '067 has been modified and adapted for use with the present invention for closed system R744 MQCL apparatus and process of the present invention. A key and new aspect of this improved R744 MQCL refrigeration system is the use of dual throttles. A (primary or first) fixed microscopic capillary throttle (40) is positioned on the downstream and terminal side (42) of a supersaturated $CO_2$ feed capillary (44) and affixed centrally within a coaxial compressed air mixing tube (46) positioned within a through-ported spindle (48). The fixed throttle capillary (40) is preferably constructed of a segment of stainless steel or PEEK polymer with inside diameters ranging between 25 microns to 0.015 inches, and lengths between 6 inches and 36 inches. The supersaturated $CO_2$ feed capillary (44) is preferably constructed of high pressure flexible PEEK polymer capable of maintaining supersaturated $CO_2$ pressures of between 1000 and 5000 psi, and having a length required to interconnect the upstream and exemplary '067 $CO_2$ generation and supply system with a high pressure supply valve (not shown in FIG. 1c) with the R744-adapted machining system (also not shown), having inside diameters sufficient to maintain said fluid supersaturation pressures and flow rates for the fixed throttle (40), ranging between 0.020 to 0.080 inches in internal diameter for operating pressures between 1000 and 5000 psi and accommodating flow rates between 0.1 and 20 lbs. $CO_2$/hour.

Very different from the conventional mechanical throttling means described under prior art FIG. 1a, the coolant flow rate (and coolant capacity) of the fixed throttle (40) of FIG. 1c is adjusted by changing the pressure of the supersaturated $CO_2$ coolant feed fluid (50) upstream in the aforementioned exemplary '067 $CO_2$ generation and supply system with a high pressure supply valve (all of which is not shown in FIG. 1c), and is metered into the feed capillary (44) using a high pressure valve (52). Supersaturated liquid $CO_2$ (50) is injected into and flowed through the inside of the feed capillary (54) at a preferred fluid pressure range of between 1000 and 5000 psi, and at a preferred fluid temperature of between 10 and 25 deg. C. As described under U.S. Patent No. '067, changing throttle capillary supersaturation pressure precisely adjusts the coolant injection rates between 0.1 lbs. to 20 lbs. $CO_2$/hour, and is dependent upon the throttle capillary design, diameter, configuration, and length, and the type of R744 refrigeration cycle employed discussed herein.

Again referring to FIG. 1c, pressure- and temperature-regulated compressed air (56) at a feed pressure between 30 and 150 psi, a flowrate between 0.5 and 10 scfm, and a temperature between 10 degrees C. and 25 degrees C. is flowed through an automated 3-way valve (58) and into a coaxial compressed air delivery line (60) which also contains the centrally disposed supersaturated $CO_2$ feed capillary (44). The coaxial tube-in-tube segment thus described may be any length needed to connect R744 MQCL fluids generation and supply system (not shown) with the R744-adapted machining system (not shown). Compressed air enters the spindle (48) through the premix conduit or tube (46) which has airflow exit perforations (62) at the entrance portion to allow the compressed air to flow both down the interior of the premix tube (46) as well out of and down the exterior region (64) between the inner surface of the spindle and the outer surface of the premix tube (46). Also shown is an optional telescoping insulating conduit or tube (66) with air flow entrance perforations (68) located at the discharge exit. The features thus described provide two fluid flow streams—a centralized cold $CO_2$-Air premix fluid stream and an outer warmer insulating air stream.

As already noted, a key aspect of FIG. 1c is the use of a secondary adjustable throttle connected to the supersaturated $CO_2$ feed capillary, and described as follows. At a predetermined infusion pressure range reached during Stage 2 of the R744 refrigeration process, termed the release-recycle pressure (RP), residual high pressure $CO_2$ gas (i.e., spent coolant) within the supersaturated $CO_2$ feed capillary (44) after injection and infusion of a predetermined amount of supersaturated and saturated liquid (i.e., dense phase) $CO_2$ through the first micro-throttle (40) is reverse flowed (70) upstream through a recycle or return capillary tube (71), 2-way valve (72), and adjustable micrometering valve (74), and is injected (76) and mixed with the upstream compressed air (78)—providing secondary precooling and $CO_2$ gas enrichment of the air stream (78). The secondary mechanical throttling valve (74) is preferably a precision 18-turn needle valve, which may be automated to vary the $CO_2$ fluid recycling (or release) flow rate. Finally, upon completion of a machining operation both $CO_2$ feed (54) and air flow (74) is terminated and all residual fluids contained within the $CO_2$ feed capillary (44) and compressed air tube (60) segments are released to the ambient atmosphere (80) through recycle tube (71), 2-way valve (72), through adjustable throttle (74), coaxial compressed air delivery tube (60) and normally open 3-way valve (58), respectively, to safely de-energize the R744 MQCL system.

Finally, also shown in FIG. 1c is a lubricant injection tube (82) which is contained within the compressed air delivery tube (60) for delivering minimal quantities of lubricant additives from a lubrication injection pump (not shown). The discharge end of the lubricant tube is positioned within the premix tube (46) just before the airflow exit perforations (62).

Figure 1D:
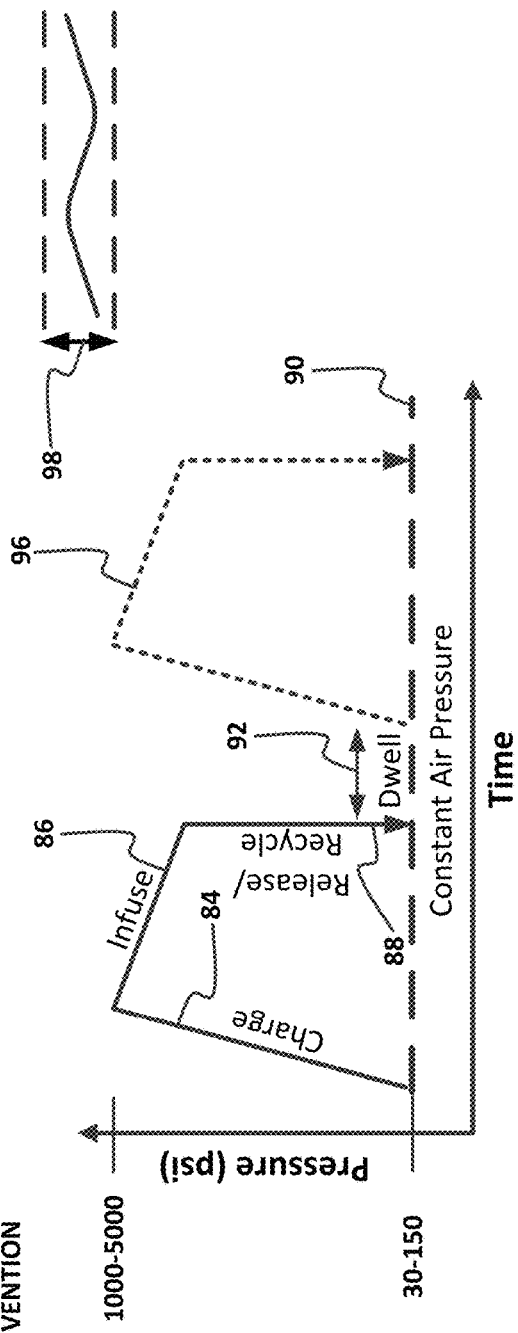
FIG. 1d—Graph and discussion of the operational characteristics of the improved R744 MQCL apparatus of FIG. 1c.

Having thus described key aspects of the first embodiment of the present invention, FIG. 1d shows a graph describing new and improved operational characteristics of the present invention.

FIG. 1d is a graph depicting key operational characteristics of the improved R744 MQCL apparatus described under of FIG. 1c. Cold premix fluid mixed with precooled and $CO_2$-enriched compressed air, and oil-infused air, are flowed into and through a ported cutting tool. Using a novel refrigeration cycle, the R744 refrigeration process is sequenced to provide optimal $CO_2$ usage, fluid mixing and cooling capacity using different $CO_2$ fluid states—so-called dense phase $CO_2$ or dense fluids (supersaturated and saturated liquid) and high pressure gas. Now referring to FIG. 1d, the present invention uses a refrigeration cycle having three distinct refrigeration stages—(Stage 1) $CO_2$ charging (84), (Stage 2) $CO_2$ infusion (86), and (Stage 3) $CO_2$ Release/Recycle (88). During this sequential refrigeration cycle the internal spindle pressure (90) is maintained at a pre-determined pressure and flowrate using pressure-regulated compressed air. The refrigeration cycle may contain a dwell period (92), followed by additional refrigeration cycles (96) as needed to maintain predetermined cooling-lubrication conditions for a machining process. The improved R744 refrigeration process thus described exhibits much lower internal pressure and temperature variance (98) over time as compared to the prior art.

Having thus described key aspects of the first embodiment of the present invention, as well as new and improved operational characteristics of the present invention, following is a detailed discussion of key aspects of the R744 refrigeration cycle.

Figure 2:
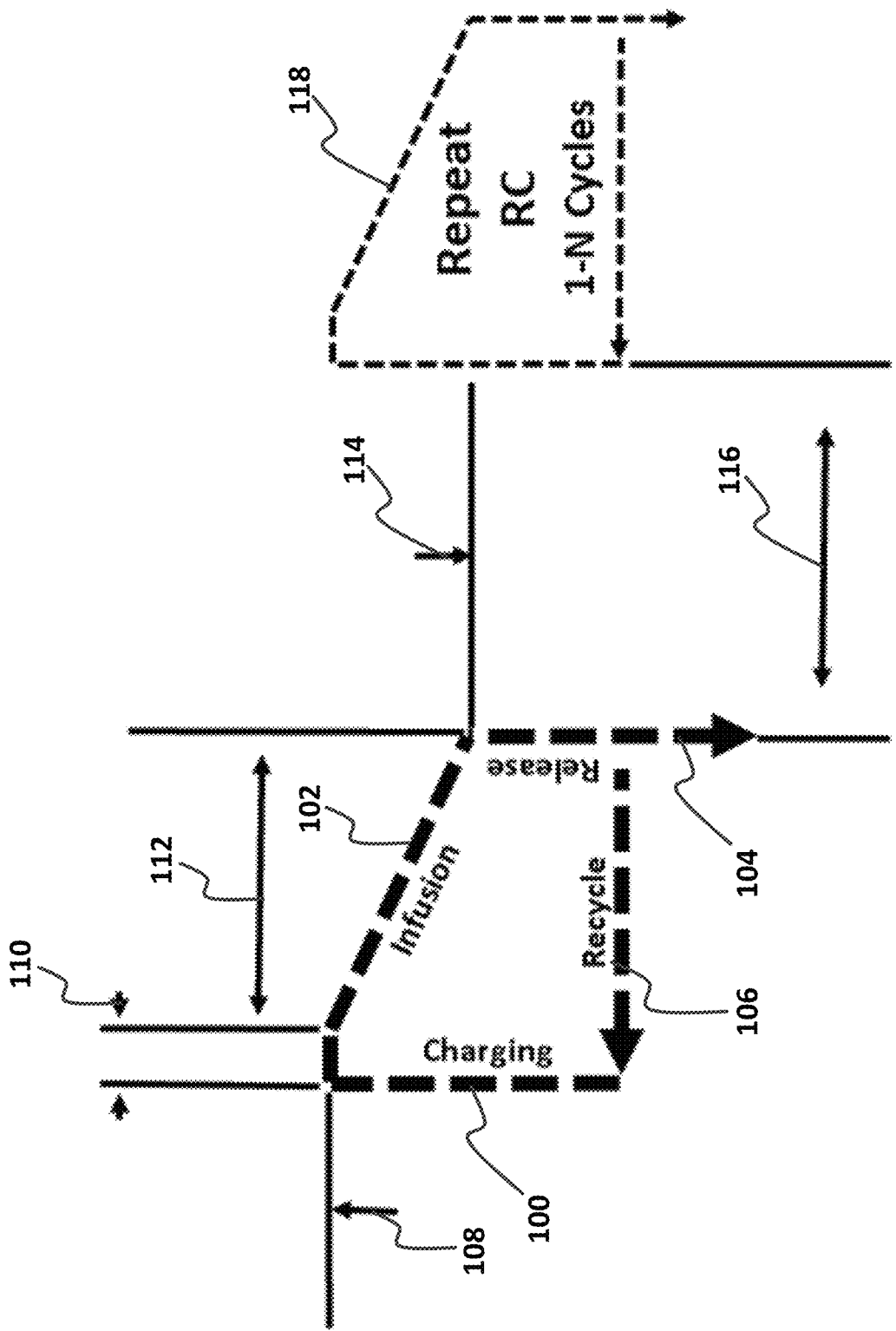
FIG. 2—Diagram showing various aspects of the R744 MQCL refrigeration cycle used in the present invention.

Referring to FIG. 2, and also with reference to FIG. 1c, the present invention utilizes a novel dual throttle, mixed-fluid and open-cycle R744 refrigeration cycle comprising three stages—Stage 1: Charging (100), Stage 2: Infusion (102) and Stage 3: Release (104) or Recycle (106), described as follows. During Stage 1 (100), saturated and supersaturated (dense phase) $CO_2$ is injected into the $CO_2$ feed capillary (FIG. 1C (44)) to a predetermined charging pressure (CP) (108) of between 1000 psi and 5000 psi for a predetermined charging time (CT) (110) to charge the refrigeration system with a certain quantity of R744 refrigerant which starts the internal refrigeration process. During Stage 2 (102) the charge fluid (FIG. 1c (54)) is infused into the premix tube (FIG. 1c (46)) under a pressure gradient through a fixed throttle (FIG. 1c (40)) during which dense phase $CO_2$ (transitioning from supersaturated $CO_2$ to saturated $CO_2$ to vapor $CO_2$ over time) is micronized into microscopic $CO_2$ particles/gas and is turbulently mixed with a portion of the internal propellant air stream under isobaric compressed air conditions to form a subcooled premix fluid ($CO_2$-Air (Oil)) which is turbulently mixed with a second portion of compressed air (and lubricant additives). Finally, during Stage 3 residual high pressure $CO_2$ gas remaining in the $CO_2$ feed capillary (FIG. 1c (44)) in recycled (106) into the upstream compressed air stream (FIG. 1c (78)) through recycle capillary (FIG. 1c (71), 2-way recycle valve (FIG. 1c (72)) and adjustable throttle (FIG. 1c (74)). The majority of the cooling capacity of the R744 refrigerator is delivered through heats of vaporization and sublimation using the first fixed micro-throttle (FIG. 1c (40)). However at the end of Stage 2 (102) of the refrigeration cycle residual high pressure $CO_2$ gas provides additional Joule Thomson (JT) expansion cooling and IR absorption cooling capacity. Residual high pressure $CO_2$ gas is a useful cooling agent for the compressed air; providing a large JT coefficient (5× greater than compressed air) and enriching the upstream compressed air with radiative cooling capacity (compressed air does not absorb IR heat). As the internal coolant pressure within the $CO_2$ feed capillary (FIG. 1c (44)) decreases to below 750 psi during the infusion cycle (102) there is an appreciable loss of cooling efficiency as it relates to infusion time using the first fixed micro-throttle (FIG. 1c (40)). As such the infusion time (112) is optimized during $CO_2$ coolant injection, with injection pressures decreasing from an initial charge pressure (108) to a Release-Recycle Pressure (RP) (114). Based on a predetermined RP (114), the spent coolant is recycled (106) into the upstream compressed air supply stream (FIG. 1c (76)), from a RP pressure of between 400 psi to 750 psi to a compressed air pressure (AP) of between 30 psi to 150 psi, providing JT expansion precooling and $CO_2$ gas enrichment of air for improved radiative cooling downstream. Upon termination of the R744 refrigeration process (i.e., completion of the machining operation), residual $CO_2$ coolant and compressed air are released (104) to the atmosphere (FIG. 1c (80)) through a 3-way recycle valve (FIG. 1c (72)) as described under FIG. 1c.

Upon completion of a complete R744 refrigeration cycle (RC) comprising Stage 1 (100), Stage 2 (102) and Stage 3 (106), there is an inter-cycle dwell time (DT) (116). The DT (116) ranges between 0 seconds (i e, immediate recycle and restart of Stage 1) to 60 seconds, or more (i e, immediate recycle and delayed restart or delayed recycle and restart). Finally, the RC may be repeated for one or more cycles (118) during a machining operation. A variety of refrigeration cycles can be implemented to optimize cooling capacity for a particular machining operation.

Figure 3:
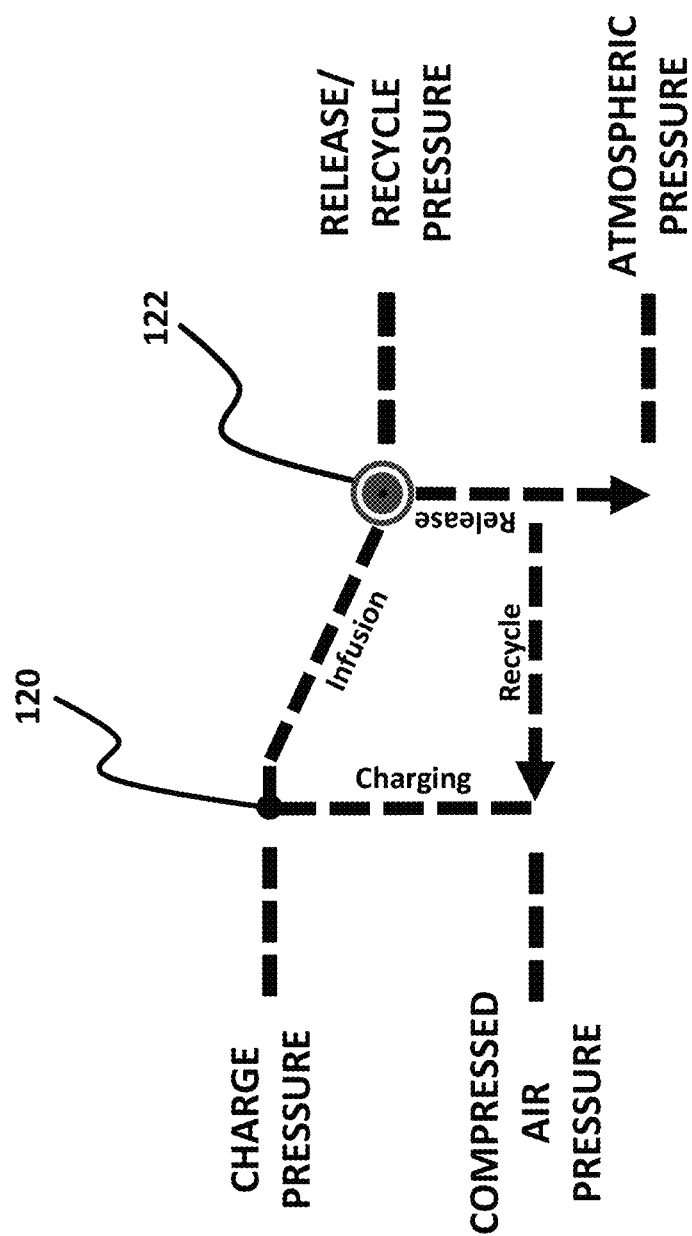
FIG. 3—Diagram showing the dual throttling aspect of the R744 MQCL refrigeration cycle used in the present invention.

Now referring to FIG. 3, a key operational aspect of the improved R744 refrigeration process described under FIG. 2 is the use of two throttles—a first pneumatically-adjusted throttle (120) comprising a micro-capillary which is pneumatically adjusted to provide precise infusion of dense phase $CO_2$ (supersaturated and saturated $CO_2$) into a portion of the airstream within the spindle followed by a second mechanically-adjusted throttle (122) which provides a relatively fast recycle (or release) of spent coolant (high pressure $CO_2$ gas) into the upstream compressed air supply to the exemplary R744 refrigerator (or into the atmosphere during release).

The basis for using two throttles in the present invention is best illustrated by examining changes in capillary pressure and premix fluid temperatures over a long single refrigeration cycle, and is described under FIG. 4a and FIG. 4b, respectively. Now referring to FIG. 4a, a pneumatically operated infusion throttle comprising a 0.008 inch×16 inch PEEK micro-capillary and an adjustable recycle throttle comprising an 18-turn micrometering valve (Milli-Mite 1300 Series, 0.047 inch orifice, 0.003 inches/turn) set at 10 turns (0.030 inch orifice) are used to charge, infuse and recycle dense phase $CO_2$ into a spindle premix tube (FIG. 1c (46)) operating with an internal compressed air pressure of 75 psi and flowrate of approximately 1 scfm through a through-ported 0.375 inch carbide drilling tool. The refrigeration parameters comprise a charge pressure (CP) of 1500 psi, an infusion time (IT) of 230 seconds, and a recycle pressure (RP) of 500 psi.

Following Stage 1 charging of the feed capillary to a CP of 1500 psi (130), supersaturated $CO_2$ is infused (132) into the premix tube (FIG. 1c (46)) and is mixed with a portion of the incoming compressed air over an IT of 230 seconds. At approximately 30 seconds, supersaturated $CO_2$ infusion changes to a saturated $CO_2$ infusion at approximately 850 psi (134) which continues along a vapor-liquid saturation line for about 60 seconds following which the saturated $CO_2$ changes to high pressure $CO_2$ vapor at approximately 750 psi (136) whereupon the capillary pressure gradually decreases (138) over the remaining infusion time. At approximately 230 seconds the residual $CO_2$ Gas (140) contained in the feed capillary tube is quickly recycled into the upstream compressed air supply, from a starting pressure of 500 psi to the compressed air pressure of 75 psi.

The premix fluid temperature profile for the refrigeration cycle described under FIG. 4a is shown in FIG. 4b. Now referring to FIG. 4b, a majority of the refrigeration capacity using the refrigeration cycle of FIG. 4a is provided during the initial 30 second infusion of supersaturated $CO_2$, followed by diminishing cooling capacity to the 90 second mark (144) using saturated $CO_2$, and much lower $CO_2$ gas expansion cooling (146) thereafter. As can be seen, the majority of the refrigeration capacity is delivered during the first 30 to 90 seconds following charging. For this particular single refrigeration cycle and operating parameters, continuing the refrigeration process beyond this point is inefficient. A more efficient refrigeration cycle involves rapid recycling of spent $CO_2$ coolant into the upstream compressed air close to the end of the dense phase $CO_2$ infusion pressure, followed by a restart of the refrigeration cycle with or without a dwell time. Shorter and more frequent infusion cycles provide the most efficient and precise temperature control during a machining operation.

Figure 4C:
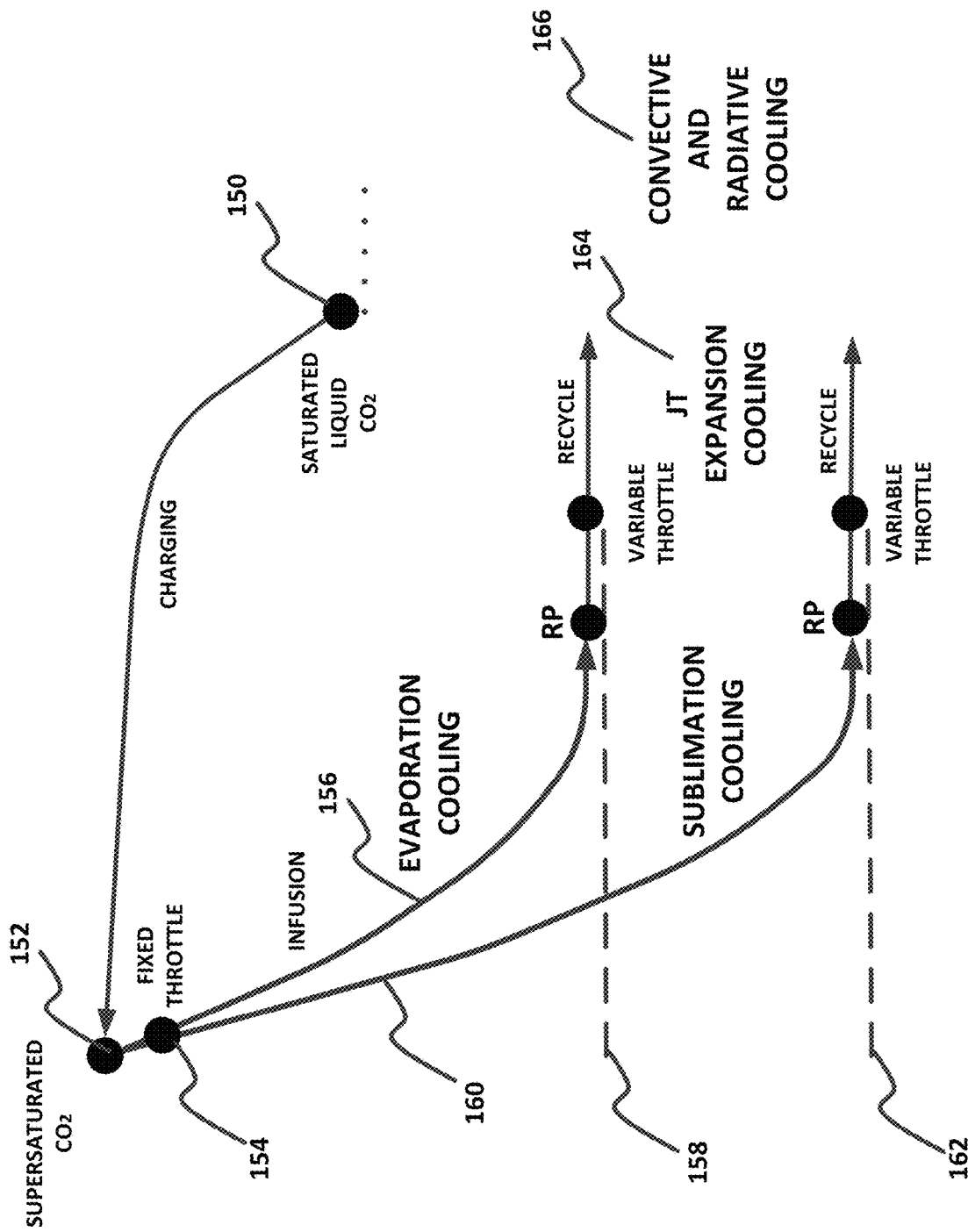
FIG. 4c—Graph showing the different cooling mechanisms provided by the R744 MQCL refrigeration cycle used in the present invention at air pressures which are above and below the triple point pressure for $CO_2$.

FIG. 4c is a graph showing the different cooling mechanisms provided by the R744 MQCL refrigeration cycle used in the present invention at air pressures which are above and below the triple point pressure for $CO_2$. Compressed air pressures above the triple point pressure for $CO_2$ (75 psi, 5.1 atm) tend to suppress the formation of dry ice particles while compressed air pressures below this point tend to favor the formation of dry ice particles. Now referring to FIG. 4c, saturated $CO_2$ (150) compressed to supersaturated $CO_2$ (152) is pneumatically throttled (154) and infused (156) into a portion of the compressed air to form a cold premix fluid at an air pressure of 100 psi (158). Under these conditions, the dense phase $CO_2$ boils during infusion providing evaporative cooling of the compressed air. By contrast, when supersaturated $CO_2$ (152) is infused (160) into compressed air at a pressure of 50 psi (162) which is below the triple point pressure, both evaporation and sublimation cooling is provided. The practical aspect of these differences is that lower compressed air pressures (and flowrate) tend to produce lower premix fluid temperatures. In both cases, JT gas expansion cooling (164) is provided. Finally, the mixed cooling fluid compositions of the present invention provide both convective and radiative cooling (166) for machining operations.

Using the present invention, different cooling capacities can be produced using different refrigeration cycles. FIG. 5 is a diagram showing different types of refrigeration cycles. Referring to FIG. 5, exemplary refrigeration cycles include:
1. Low Frequency Cycles (170)
2. Medium Frequency Cycles (172)
3. High Frequency Cycles (174)
4. Continuous Cycles (176)

For a given machining operation (178), a general relationship exists between cutting tool-port diameter (180) and optimal refrigeration cycle. Lower frequency refrigeration cycles work well for small cutting tools with small coolant ports. Higher frequency or continuous refrigeration cycles work well for larger cutting tools and coolant ports. For example, a continuous injection cycle (i.e., maximum cooling power) would generally not be useful for small cutting tool-port diameters as this could introduce excessive cooling capacity—resulting in possible icing ($CO_2$/water ice formation), additive gelation, and/or spindle overpressure conditions (internal spindle-tool cavity pressure rises above incoming propellant air pressure). However, using a smaller fixed throttle and lower charging pressure would mitigate these issues.

Figure 6A:
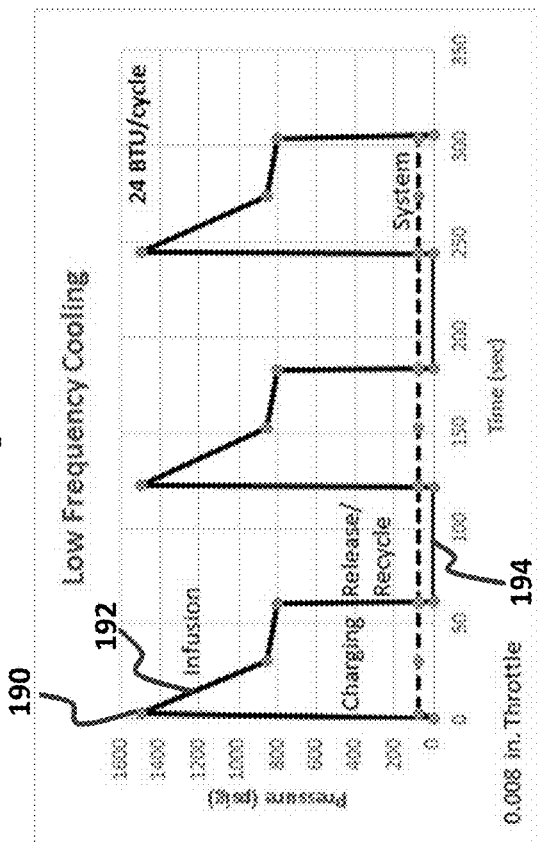
FIG. 6a—Graph showing the cooling capacity provided using an exemplary low frequency R744 refrigeration cycle.
Figure 6B:
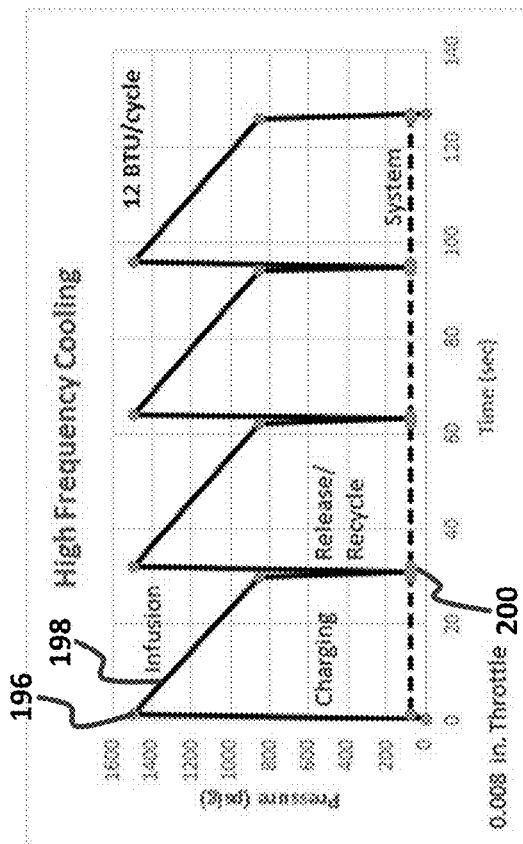
FIG. 6b—Graph showing the cooling capacity provided using an exemplary high frequency R744 refrigeration cycle.

Exemplary refrigeration cycles are shown under FIGS. 6a and 6b with calculated cooling capacities delivered for the exemplary refrigeration cycles (RC). FIG. 6a shows a low frequency refrigeration cycle using a 0.008 inch diameter by 16 inch long throttle operating at a charging pressure (CP) of 1500 psi (190), a 60 second infusion time (IT) (192), and a 60 second dwell time (DT) (194)—delivering about 300 BTU/hr. cooling capacity. FIG. 6b shows a high frequency refrigeration cycle using a 0.008 inch diameter by 16 inch long throttle operating at a CP of 1500 psi (196), an IT of 30 seconds (198), and no dwell time (DT) (200)—delivering about 1400 BTU/hr. cooling capacity.

Figures 7A, 7B:
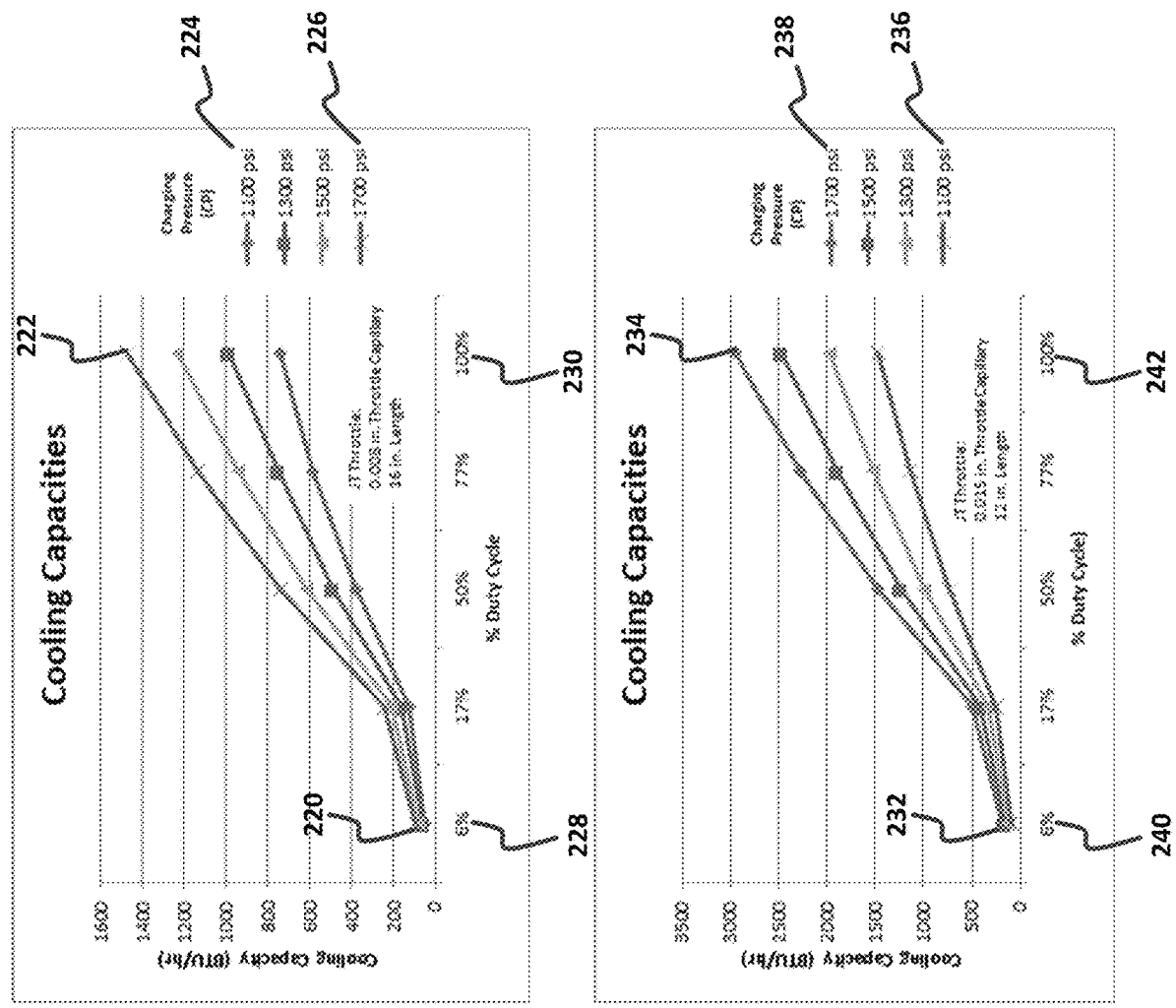
FIG. 7a—Graph showing the exemplary range of cooling capacities possible using a 0.008 inch diameter by 16 inch long fixed injection throttle.
FIG. 7b—Graph showing the exemplary range of cooling capacities possible using a 0.015 inch diameter by 12 inch long fixed injection throttle.

Dwell time (DT), infusion throttle diameter (and length), and charging pressure (CP) have a pronounced effect upon the cooling capacity of the R744 refrigeration system of the present invention. Dwell time is best understood in terms of a duty cycle—cooling for a period of time and not cooling for a period of time. Duty cycle is defined herein as the percentage of the time cooling during a machining process. FIG. 7a and FIG. 7b show the range of cooling capacities possible in relation to charging pressure (CP) and duty cycles ranging from 6% (pulsed cycle) to 100% (continuous cycle) for 0.008 inch by 16 inch long and 0.015 inch by 12 inch long capillary throttles, respectively.

Referring to FIG. 7a, a 0.008 inch throttle produces R744 refrigeration capacities between 150 BTU/hour (220) and 1500 BTU/hour (222) for charging pressures between 1100 psi (224) and 1700 psi (226) and duty cycles between 6% (228) and 100% (230), respectively. Referring to FIG. 7b, a 0.015 inch throttle produces R744 refrigeration capacities between 200 BTU/hour (232) and 3000 BTU/hour (234) for charging pressures between 1100 psi (236) and 1700 psi (238) and duty cycles between 6% (240) and 100% (242), respectively.

The optimal refrigeration cycle is determined experimentally and is dependent upon a combination of several key and interrelated machining process variables, including:

1. Type(s) of workpiece (i.e., Ti, CFRP, Al, and Stack-up configurations).
2. Spindle-Tool Port diameters (system flow-through capacity).
3. Machining speed, feed rate, and depth of cut.
4. Cutting tool geometry and coating (i.e., uncoated WC, PCD, TiN, and TiAlN).
5. Machining process (i.e., drilling, milling, turning).
6. Machining time.
7. Atmosphere (i.e., dry, near-dry, level of oxygenation).

These factors influence the needed cooling capacity, optimal refrigeration profile, and cooling-lubrication composition—all of which are constrained by spindle-tool flow-through capacity, types of workpiece(s), and variable heat loads related to same.

Having thus described key aspects of the first embodiment of the present invention, following is a detailed discussion of use of the exemplary R744 refrigeration process in an exemplary design and machining application for same.

Figure 8A:
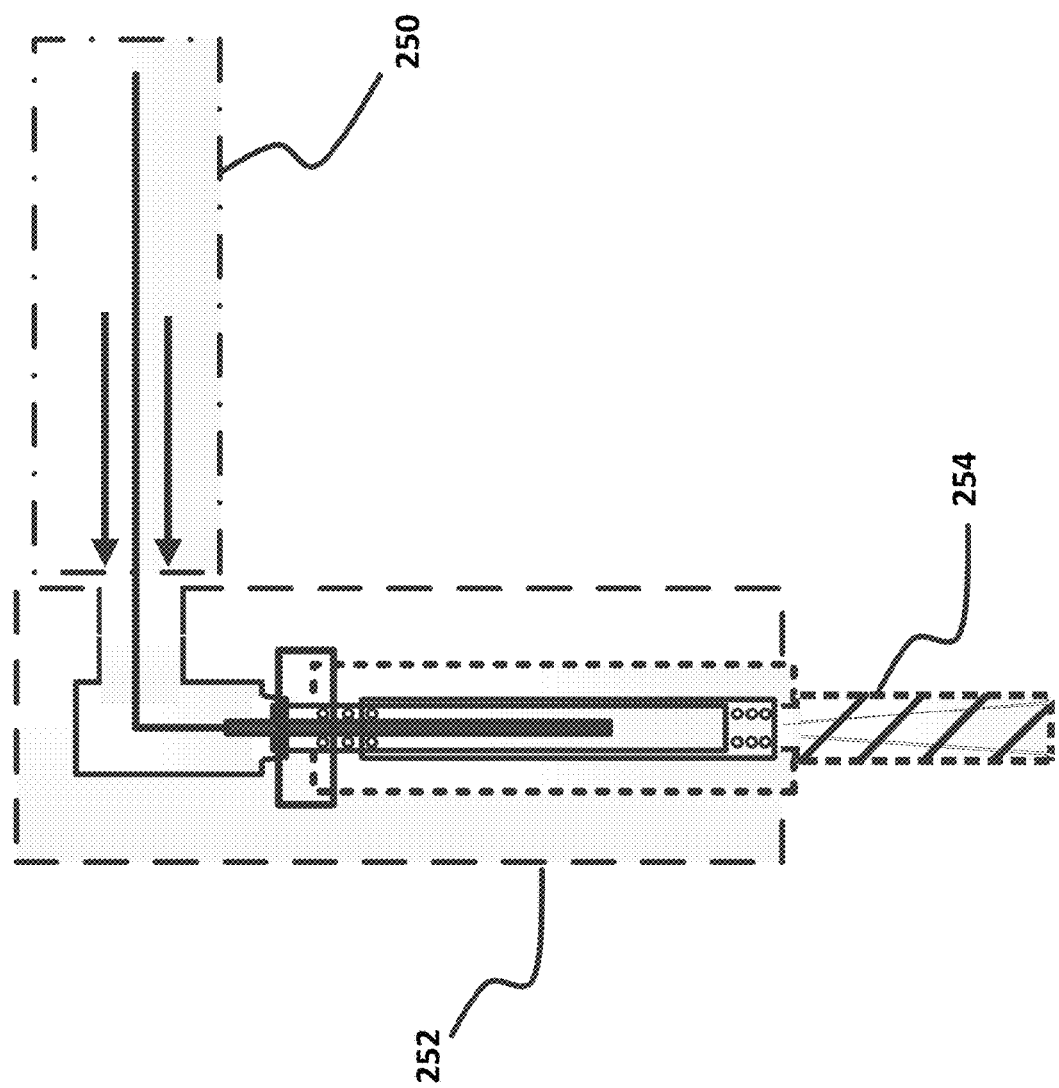
FIG. 8a—Schematic and discussion of major subsystems of an exemplary R744 refrigerated cooling lubrication system adapted to a portable drilling machine.

FIG. 8a is a schematic of major subsystems of an exemplary R744 refrigerated cooling lubrication system of the present invention adapted to a portable drilling machine. Referring to FIG. 8a, an exemplary use of the present invention is in a portable drilling machine, the R744 MQCL adapted system comprising a R744 refrigeration fluids generator and control system (250), a R744 refrigerator-applicator system (252), and a drill motor spindle-tool system (254). Exemplary portable drilling machines (i.e., Quackenbush and Recoules systems) suitable for use with the present invention are available from APEX Tool Group, Lexington, S.C.

Figure 8B:
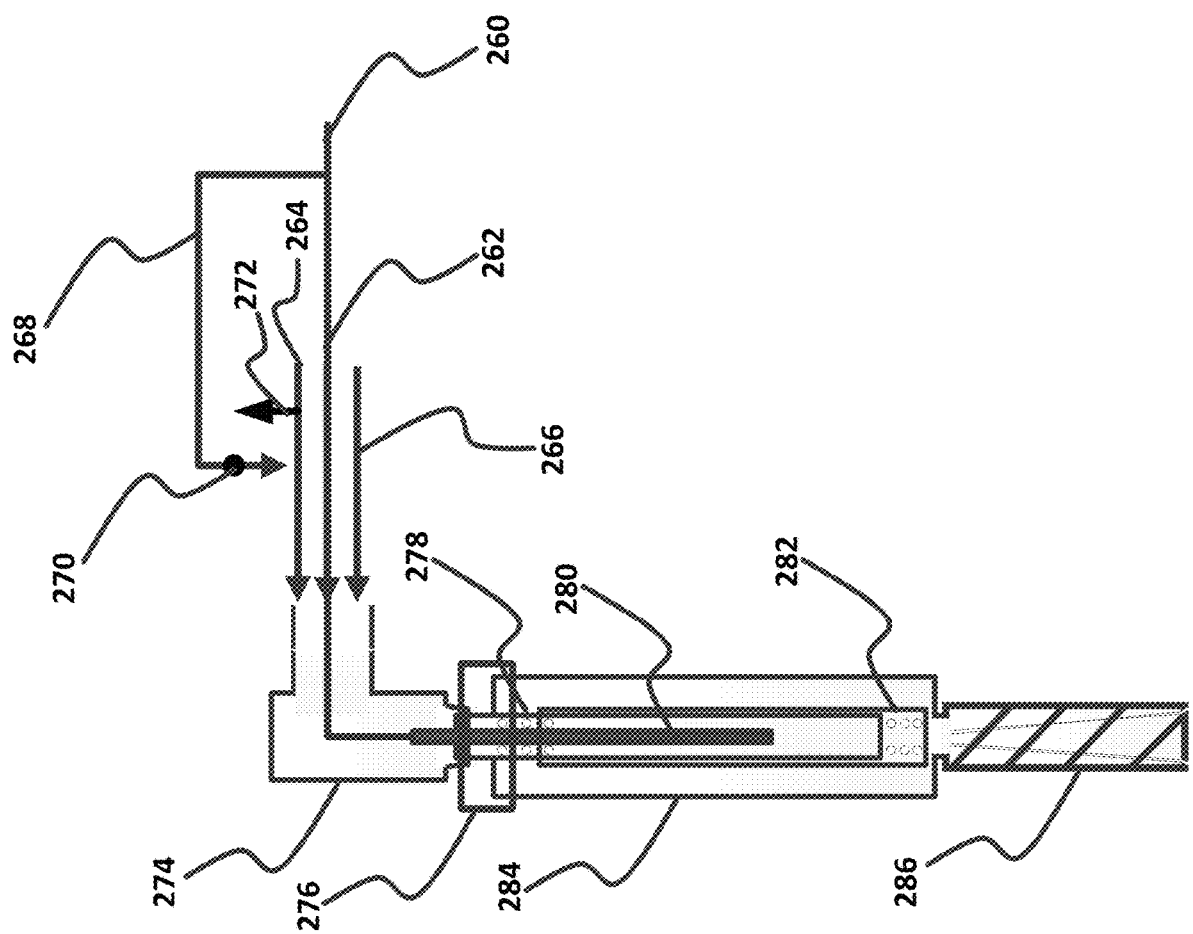

FIG. 8b provides additional exemplary aspects of the R744 MQCL adapted machining system of FIG. 8a. Referring to FIG. 8b, the exemplary R744 refrigeration fluids generator and control system (FIG. 8a (250)) comprises a supply of supersaturated $CO_2$ (260) fed through a $CO_2$ feed tube (262), a supply of compressed air (264), and a supply of lubricant additive (266). The exemplary R744 refrigeration fluids generator and control system further comprise a $CO_2$ fluid recycling plumbing circuit (268) equipped with a mechanically adjusted throttle (270) and a $CO_2$-air fluids release plumbing circuit (272). The exemplary R744 refrigerator-applicator system (FIG. 8a (252)) comprises a rotary union (274) for accepting said $CO_2$ capillary feed tube (262), lubricant additive tube (266), and compressed air tube (264) containing same. A spindle adaptor (276) integrates the rotary union (274), perforated premix tube (278), fixed throttle (280), and optional telescoping (moveable) premix tube conduit (282) to the exemplary drill motor spindle-tool system (FIG. 8a, (254)). Finally, the exemplary drill motor spindle-tool system (FIG. 8a, (254)) comprises a through-ported spindle (284) and cutting tool (286). Not shown in FIG. 8b is a drive motor which attaches to the spindle (284).

Figure 9:
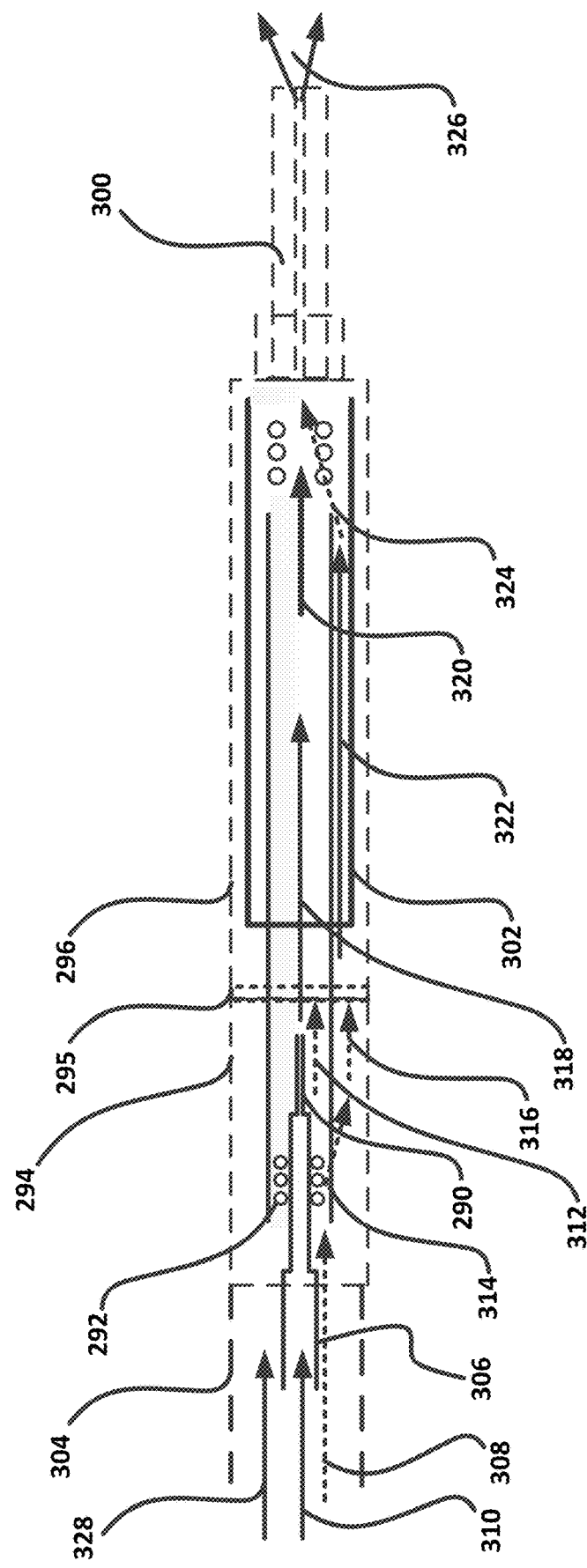
FIG. 9—Schematic showing of the exemplary refrigeration system components—charger, infuser, premix tube, and optional telescoping premix tube sleeve—positioned and operated within a machining spindle cavity.

FIG. 9 is a schematic illustrating key aspects of the exemplary R744 refrigerator-applicator system (FIG. 8a (252)) and in particular the infuser, premix tube, and optional telescoping premix tube sleeve, all of which are positioned within the exemplary drill motor spindle-tool system (FIG. 8a, (254)). Now referring to FIG. 9, exemplary aspects of the R744 refrigerator-applicator system comprise a micro-capillary throttle (290) centrally positioned and affixed to a perforated premix tube or conduit (292), both of which are affixed to a rotary union (294) using a spindle adaptor (295)—the combination of which is called the R744 refrigerator-applicator herein. The rotary union (294) is affixed to a machining spindle (296) using a spindle adaptor (not shown). A through-ported cutting tool (300) is affixed to the machining spindle (296). An optional telescoping conduit (302) which is moveable over the perforated premix tube (292) to expand and extend the premix conduit (292) volume as the spindle moves with the cutting tool during drilling operations.

Having discussed exemplary key aspects of the exemplary R744 refrigerator-applicator, following is a discussion of mixed fluid inputs, flows and mixing patterns.

Again referring to FIG. 9, a compressed air supply tube (304) containing a $CO_2$ feed capillary tube (306) is affixed to the rotary union (294) and micro-capillary throttle (290) to provide compressed air (308) and supersaturated $CO_2$ (310) into the R744 refrigeration-applicator, respectively. Compressed air flows downstream through the interior (312) of the premix conduit (292) as well as exits the premix conduit through perforations (314) and flows down the space (316) between the inside surface of the spindle and the outside surface of the premix conduit (292). Compressed air (312) and dense phase $CO_2$ (318) mix within the premix conduit (292) to form a cold premix fluid stream (320). Compressed air flowing (322) along the exterior of the premix conduit (292) enters through perforations (324) on the telescoping conduit (302) and mixes with the cold premix fluid (320) to form a cooling fluid prior to entrance into and passage through the cutting tool (300), which then enters the cutting zone (326). A lubricant injection tube (328) is positioned at the entrance to the premix conduit (292) before the premix tube perforations (314). Lubricated compressed air flows biaxially as described for unlubricated compressed air flow. The movement of two separate portions of compressed air (or lubricated compressed air) vis-à-vis the interior flow stream (312) and exterior flow stream (316) balances internal mixed fluid pressure during injection of high pressure dense phase $CO_2$ (318) into the lower pressure compressed air (308) and thermally insulates the interior surfaces of the spindle (296) from the cold premix fluid (320).

FIGS. 10a, 10b and 10c are schematics showing compressed air flow through the exemplary perforated premix tube and movement of the optional telescoping premix tube sleeve assembly described under FIG. 9. The telescoping sleeve containing perforations along it discharge end is constructed preferably of a polymer tube such as Teflon to provide low friction against the premix tube (332) and spindle (339) surfaces and good thermal insulating properties. Referring to FIG. 10a, compressed air (330) enters the premix conduit (332) and flows through the interior (333) and the perforations (334). Compressed air flowing along the exterior region (336) exerts a force on the telescoping conduit (339) which moves in relation to the spindle (339). Referring to FIGS. 10b and 10c, the telescoping conduit or sleeve (337) moves forward with the spindle (339) with constant compressed air assist (338). As the spindle moves backward, the telescoping sleeve is pushed rearward to its original position. Alternatively, a spring tensioner (not shown) may be used to provide mechanical force (and resistance) to the telescoping conduit (337) during spindle (339) movement.

FIG. 11 is a schematic of an exemplary R744 refrigeration fluids generator and control system (FIG. 8a (250)). Referring to FIG. 11, mixed fluids comprising supersaturated $CO_2$ (400), pressure-regulated compressed air (402), and liquid lubricant (404) are individually metered, mixed, and applied to a cutting operation using an exemplary R744 refrigeration-applicator (406) (FIG. 9), described as follows.

Supersaturated $CO_2$ (400) is produced by compressing saturated liquid $CO_2$ (408) having a liquid density less than 0.9 g/ml (approximately 850 psi/70 Deg. F.) to a density greater than 0.9 g/ml (approximately 1000 psi or greater at 70 Deg. F.) using a pneumatic compressor (410), which is controlled using compressed air supplied through a pump air valve (412) and through a digitally or manually controlled pump air pressure regulator (414), and is stored in a supersaturated $CO_2$ storage vessel (416). A pressure relief valve (418) recycles supersaturated $CO_2$ back to the supply source (not shown) when a maximum preset relief pressure is reached, for example 5000 psi. The supersaturated $CO_2$ charging system (420) as well as the micro-capillary throttling device described under FIG. 9 (290) have been adapted for use in the present invention from U.S. Patent No. '067, FIG. 4a, developed by the first named inventor. Supersaturated $CO_2$ is pneumatically metered through a high pressure 2-way $CO_2$ valve (422) and into a high pressure $CO_2$ capillary feed tube (424) which is fluidly connected to micro-capillary throttle (FIG. 9 (290)) enclosed in the exemplary R744 refrigeration-applicator (406). Following charging of the capillary feed tube (424) with dense phase $CO_2$ to a predetermined CP and for a predetermined CT, the 2-way $CO_2$ supply valve (422) is closed to allow for the continued infusion of a quantity of dense phase $CO_2$ through said micro-capillary throttle to a predetermined RP, following which residual high pressure $CO_2$ gas is recycled (426) into the upstream compressed air supply through a 2-way recycle valve (428) and through an adjustable 18-turn throttle valve (430).

Pressure-regulated compressed air (402) is metered through 3-way compressed air (and release) valve (432) which is fluidly connected to the R744 refrigeration-applicator (406) through a compressed air supply tube (434) which coaxially contains both the $CO_2$ capillary feed tube (424) and lubricant supply tube (436). An air pressure relief valve (438) is fluidly connected to said compressed air supply tube (434) and based on a preset overpressure limit discharges air (and $CO_2$ gas pressure) during any unexpected internal overpressure condition within the R744 refrigeration-applicator (406).

Finally, liquid lubricant additive (440) is metered using a micrometering pump (442) fluidly connected to said liquid lubricant supply tube (436) which is fluidly connected to said R744 refrigeration-applicator (406).

The apparatus of FIG. 11 is preferably controlled using a process logic controller (PLC) to provide the programming and analog/digital input/output necessary to execute one or more refrigeration processes described herein. For example a PLC (444) and a charge pressure switch/sensor (446) are used to operate the injection of supersaturated $CO_2$ by operating 2-way $CO_2$ feed valve (422) through an electronic control circuit (448), and $CO_2$ recycle valve (428) through electronic control circuit (450). Moreover, the PLC (444) may control the supersaturated $CO_2$ charging system (420) and required CP directly by controlling a digitally controlled pump air pressure regulator (414). In addition, the PLC (444) and air pressure switch/sensor (452) are used to control compressed air flow (454) and $CO_2$-Air fluid release (456) by operating 3-way compressed air supply (and release) valve (432) through electronic circuit (458). Finally, the PLC (444) is used to directly control the lubricant micrometering pump (442) through electronic circuit (460).

Finally, another important aspect of the present invention is that the R744 MQCL process is adaptive to different machining processes and substrates. Using a PLC scheme thus described provides for real-time input from the machining tool/system regarding changes in machining conditions, for example cutting force or cutting speed changes. For example adaptive machining technology described under U.S. Pat. Nos. 8,277,154 and 8,317,437 provide cutting force measurement (i.e., torque) data which is related to cutting speeds, feed rates, and the types of substrate being machined. Such data can be used to change the R744 MQCL conditions to more optimal and predetermined cooling-lubricating conditions simultaneously with changes made to machining tool conditions.

Having discussed exemplary R744 MQCL apparatus, process and operation of the present invention, following describes aspects of the second embodiment of the present invention comprising a superspreading lubricant composition for use in same.

FIG. 12a is a graph showing the relationship between system fluid temperature with increasing viscosity and surface tension, and gel point for conventional (undiluted or neat) lubricants. Referring to FIG. 12a, lubricant additive clogging issues using the prior art are caused by R744 MQCL internal system temperatures decreasing to the solidification or gel point of a neat lubricant or lubricant composition. During the R744 cooling process the temperature (500) of the internal mixed fluid $CO_2$-Air-Oil atmosphere decreases abruptly causing both the surface tension (502) and viscosity (504) of the lubricating components to increase until gel point (506) is reached, whereupon it solidifies onto internal spindle surfaces or within coolant port passages.

One approach for solving this problem is to use lubricants with much lower gel points. However, these types of lubricants tend to be synthetic, semi-synthetic, or silicone-based oils, which are not necessarily suitable or permitted for use in MQL or MQCL applications due to a combination of performance, environmental, manufacturing, and cost considerations. Bio-based lubricants are very attractive due to their excellent environmental, safety, and lubricating characteristics, particularly in metal cutting applications, and when used in minimum quantities. However, a major drawback of using bio-based lubricants in R744 MQCL applications is their high temperature gel points, and particularly at the very low temperatures achievable using the present invention.

The technical solution chosen by the present inventors to improve R744 MQCL performance comprises two complimentary components. As already discussed in detail herein, the first component (first embodiment) is an improved R744 refrigeration process and apparatus to mitigate dry ice formation and the formation of $CO_2$-laden oil agglomerations. A complementary solution (second embodiment) has been developed that involves decreasing the apparent gel point of preferred bio-based lubricant additives used in same, and is discussed in the following sections.

FIG. 12b is a graph showing the conditions required for a low gel point lubricant. Referring to FIG. 12b, During the R744 cooling process the temperature (500) of the internal mixed fluid $CO_2$-Air-Oil atmosphere decreases abruptly from ambient compressed air temperature to as low as −30 deg. C. A lubricant solvated with an appropriate carrier solvent possesses both low both lower apparent surface tension (508) and viscosity (510), and as a result its gel point (512) is lowered significantly which prevents solidification at much lower operating temperatures. Using this approach, a lubricant or lubricant composition, preferably bio-based, is dissolved as a fractional solute into a carrier solvent having a very low melting point, and preferably an eco-friendly solvent having a number of other important performance properties such as high volatility and non-flammability.

A suitable lubricant carrier solvent for use in the present invention preferably possesses all of the performance characteristics listed under Table 1.

TABLE 1

Carrier Solvent Performance Criteria

1. High $CO_2$ solubility to insure complete mixing (heat transfer) and a uniform low-temperature minimum quantity cooling lubrication composition.
2. High lubricant solubility to provide a range of lubricities (deposited film thicknesses).
3. Very low melting point to prevent solidification or gelation of solvent and solute when mixed with extremely cold $CO_2$ particles and fluids.
4. Non-flammability.
5. Non-toxicity.
6. Not a volatile organic compound (VOC).
7. Low or no odor.
8. High material compatibility.
9. Low surface tension and viscosity.
10. Higher evaporation rate relative to the lubricant additive to provide thin film lubricant deposition upon injection into the hot cutting zone.

Several green solvents were evaluated as potential low-temperature lubricant carrier solvents for an industry standard bio-based lubricant called Boelube® 70104 (an Oleyl and Cetyl Alcohol Blend) at 10% (v:v) oil additive levels. Melting points and solubility parameters for the test series is shown in Table 2. As shown under Table 2, solvents investigated included isopropyl alcohol, acetone, propylene carbonate, and d-limonene. During fluid injection, mixing and surface deposition evaluations using the present invention, all solvent candidates exhibited good low temperature service capability (i.e., mitigated $CO_2$ icing issues), however each solvent exhibited varying degrees of oil solubility and other undesirable performance characteristics. Propylene carbonate, a non-flammable solvent, and isopropyl alcohol, a flammable solvent, exhibited poor oil solubility. Moreover, propylene carbonate did not volatilize upon surface deposition at room temperature and isopropyl alcohol produced a strong and characteristic alcohol odor during spray tests. Limonene, a flammable solvent, solubilized the test oil extremely well in all proportions, which was expected based upon similar solubility parameters, but produced significant citrus-like odor and did not evaporate quickly upon surface deposition. Acetone, a highly flammable solvent, exhibited the best overall performance of the test group but also produced a strong and characteristic ketone odor. In summary, the solvents tested under Table 2 exhibited a few but not all of the preferred performance characteristics listed in Table 1.

TABLE 2

Freeze Points and Solubility Parameters
Test Solvents and Solute

| Carrier Solvent (Test Solute) | Melting Point (Deg. C.) | Solubility Parameter (MPa$^{1/2}$) |
|---|---|---|
| Isopropyl Alcohol (IPA) | −89 | 23.4 |
| Acetone | −95 | 19.7 |
| Propylene Carbonate (PC) | −49 | 27.2 |
| d-Limonene | −96 | 16.6 |
| Solute: | Oleyl Alcohol 13-19 | 16.6 |
| Boelube ® 70104 | Cetyl Alcohol 49 | |

During further investigation and experimentation with a silicon-based solvent, it was discovered that volatile methyl siloxane (VMS), and specifically a cyclic VMS called decamethylcyclopentasiloxane (D5), uniquely provided all of the preferred performance properties under Table 1. Most significantly and quite unexpectedly, it was discovered that non-polar D5 (solvent) containing a fractional amount of a polar bio-based lubricant (solute), for example Boelube® 70104, produced a unique and new key performance characteristic which is highly beneficial to the present invention—superspreading behavior. Various compositions of D5 and Boelube® lubricant ranging from 95:5 (v:v) to 50:50 (v:v), respectively, were tested. All compositions tested superspread on both metal and polymer surfaces—each depositing increasing film thicknesses of Boelube® lubricating films with increasing concentration of Boelube® solute in the D5 carrier solvent. This rapid mass transfer phenomenon over a surface is presumed to be due to the presence of a significant solvent-solute surface tension gradient—the so-called solutocapillary or Marangoni Effect. Superspreading behavior has been observed for exemplary compositions of the present invention on both polar Aluminum and non-polar carbon fiber reinforced polymer (CFRP) surfaces. The present embodiment provides R744 MQCL compositions capable of very low-temperature service with significantly increased (and adjustable) lubricated surface areas during application. For example, it is observed that larger surface area spreading occurs for more dilute D5-Boelube® formulations.

Experiments were performed using an exemplary R744 refrigeration system of the present invention with exemplary superspreading compositions and an IR heating lamp to simulate mixing, application, spreading and evaporative effects on exemplary manufacturing surfaces. A R744 MQCL composition comprising—DS:Boelube® 50:50 (v:v)—was sprayed onto heated and unheated CFRP and Aluminum surfaces. It was observed that the D5 carrier solvent containing the Boelube® solute is conserved during the cold $CO_2$ fluids mixing and application process, with no phase separation or visible gelation of the Boelube® solute. The mixture begins to spread immediately upon application to the test surface. The D5 evaporates from the mixture following superspreading leaving a thin film of Boelube® lubricant. The superspreading (and D5 evaporation) rate increases with IR heating, simulating conditions present in a cutting zone.

FIG. 12c is a graph showing calculated surface tension and viscosity values for a range of VMS (D5) and Boelube® 70104 compositions. Referring to FIG. 12c, calculated surface tension (centipoise, cps) and viscosity (dynes/cm) values are tabulated (514) and plotted for DS:Boelube® 70104 compositions ranging from 100% D5 (no Boelube® solute) to 100% Boelube® (no D5 solvent). As shown in FIG. 12c, for a 95:5 (v:v) DS:Boelube® composition (516) the viscosity (518) of the undiluted Boelube® decreases from 28 cps to an apparent viscosity of 5 cps, or an 82% reduction (520). Similarly, the surface tension (522) of the undiluted Boelube® decreases from 35 dynes/cm to an apparent surface tension of 18 dynes/cm, or a 46% reduction (524).

Exemplary formulations in the present invention employ only a fraction of the lubricating oil typically used in conventional MQL aerosols—enabling much lower lubricant usage levels of between 1-25 ml Oil/hour as compared to conventional MQL usage levels between 50-150 ml Oil/hour. Preferred high-boiling and non-volatile polar lubricants include alcohols such as Oleyl and Cetyl Alcohol, for example as used in the exemplary benchmark fluid Boelube® 70104, as well as bio-esters such as Oleic acid. However other lubricating solutes such as synthetic oils and mineral oils, and blends of same, may be used in the present invention.

Importantly, the new composition (and method of mixing same within a R744 fluid system) behaves as a low-temperature deicing (anti-freezing) mixture which mitigates $CO_2$ particle accumulation and lubricant gelling during $CO_2$ particle and fluid expansion cooling and mixing processes described herein. Moreover, the cyclic VMS carrier solvent significantly reduces the surface tension and viscosity of the lubricating additives which improves their flow characteristics under low temperature conditions. As the VMS solvent carrier separates (evaporates) from the lubricant additives during deposition the surface tension and viscosity of the lubricant additives increase and return to their original levels which adapts the composition to the higher temperature and friction-reducing performance demands of the cutting operation. Moreover, the preferred cyclic VMS carrier solvents of the present invention possess very low latent heat of vaporization which prevents excessive cooling and gelling of the lubricant(s) during evaporation from the composition during transport into the cutting zone. Finally, a range of lubricity levels (and thin film thicknesses) can be formulated as needed for a particular machining application.

The high mutual solubilities of the exemplary compounds and mixtures comprising $CO_2$ (coolant gas), VMS (D5—carrier solvent) and lubricant (Boelube® 70104 lubricant solute) used in the present invention is due to their remarkably similar solubility parameters, illustrated under Table 3.

TABLE 3

Comparison of Solubility Parameters

| Compound | $\delta_D$ | $\delta_P$ | $\delta_H$ | $\delta_T$ $(MPa^{1/2})$ |
|---|---|---|---|---|
| Boelube ® (Oleyl Alcohol (OA)) | 14.3 | 2.6 | 8.0 | 16.6 |
| VMS (D5) | 15.1 | 0 | 0 | 15.1 |

TABLE 3-continued

Comparison of Solubility Parameters

| Compound | $\delta_D$ | $\delta_P$ | $\delta_H$ | $\delta_T$ $(MPa^{1/2})$ |
|---|---|---|---|---|
| $CO_{2\ (g)}$ | 15.7 | 6.3 | 5.7 | 17.9 |
| Mixture (D5/OA 95:5 v:v) | 15.0 | 0.6 | 1.8 | 15.1 |
| Mixture (D5/OA 50:50 v:v) | 14.7 | 1.8 | 5.6 | 15.8 |

REFERENCES

Handbook of Solubility Parameters and other Cohesion Parameters, First Edition, CRC Press, A. F. Barton Hansen Solubility Parameters: A User's Handbook, Second Edition, CRC Press, C. M. Hansen Another beneficial characteristic of the cyclic VMS carrier solvent is its high oxygen solubility and resistance to ozone oxidation. As such the VMS carrier solvent of the present invention is a useful diluent and medium for oxygenation processes described in a co-pending invention by the first named inventor and described under U.S. patent application Ser. No. 13/733,880, Method for Forming and Applying an Oxygenated Fluid. This co-pending invention may be used in cooperation with the present invention.

Although this second embodiment is particularly directed to resolving icing and clogging problems associated with a through-ported spindle-tool system, the present embodiment may also be used as an ultra-lean MQCL spray jet. In addition, the cyclic VMS (D5) may be injected directly into liquid carbon dioxide and expanded to form a cold $CO_2$-D5 premix fluid composition which is then mixed with compressed air carrying the preferred bio-based oil additive to form a superspreading MQCL fluid. In summary the second embodiment of the present invention provides a very unique combination of R744 MQCL process performance improvements, summarized under Table 4.

TABLE 4

R744 MQCL Performance Improvements

| Property | Description |
|---|---|
| Anti-Freezing | $CO_2$ sublimation, vaporization and specific heat is transferred to the VMS-oil (solvent-solute) during injection and mixing, conserving heat capacity while preventing internal icing. |
| Thin Film Deposition | VMS is much more volatile than the oil component and additives and produces very thin films of oil having various thicknesses on surfaces. |
| Wetting | VMS significantly lowers surface tension of oil mixtures and additives to provide improved wetting of machined surfaces. |
| Penetration | Low surface tension VMS penetrates cutting interfaces more readily to deliver cooling, lubrication or oxygenation actions. |
| Superspreading | VMS and polar lubricant additives superspread on both polar and non-polar surfaces to increase availability of lubricant to surfaces as ultra-thin films. |
| Oxygenation | VMS carries more oxygen into the cutting zone due to its high affinity for oxygen, ozone gas and oxygenated bio-based lubricants. VMS is an excellent oil-oxygenation medium. |
| Cleaning Action and Cleanability | VMS-oil mixtures clean surfaces during machining more effectively and are more easily removed from surfaces. VMS dissolves a range of suitable lubricant compounds to form MQCL compositions ranging from near-zero to 50%, or higher by volume, injecting between 1 and 50 ml/hour (neat lubricant) as uniform ultra-thin lubricating films. |
| Ultra-MQCL | |

Finally, it is very important to differentiate cyclic VMS solvents from high-boiling silicone oil lubricants. Cyclic VMS solvent chemistry suitable for use in the present invention, and in particular D5, is a non-oily, low viscosity and low molecular weight (371 g/mole) solvent that evaporates relatively quickly following the injection, mixing and spray application used in the present invention. Being non-polar and having a low molecular weight, cyclic VMS compounds do not serve as effective boundary layer lubricants for metal machining applications. However our work has shown that they are excellent carriers of polar bio-based lubricating fluids (and in trace amounts). Moreover, thin films incorporating residual VMS and trace polar lubricating films are more easily cleaned from substrate surfaces. By contrast, silicone oils are non-volatile long-chain polymerized siloxane units with organic side chains, for example polydimethylsiloxane, with molecular weights 100× higher than cyclic VMS solvent—ranging between 37 kDa to 65 kDa (37,000 to 65,000 g/mole). Silicone oils possess high thermal stability, very low volatility, and provide lubricating properties in applications such as low temperature mechanical lubrication. Moreover, silicone oils are notorious and banned in many manufacturing operations because they deposit long-lasting surface films which greatly complicates secondary manufacturing operations such as surface cleaning, painting, and sealing, among other manufacturing operations.

Table 5 provides important physical properties for an exemplary and preferred cyclic VMS carrier solvent for use in the present invention—decamethylcyclopentasiloxane or abbreviated as D5.

TABLE 5

VMS (D5)

| Chemical name | Decamethylcyclopentasiloxane (D5) |
|---|---|
| CAS No. | 556-67-2 |
| Molecular Weight | 371 g/mole |
| Density @25° C. | 0.954 g/ml |
| Viscosity at 25° C. | 4.0 cps |
| Refractive index | 1.397 |
| Solubility parameter | 15.1 MPa$^{1/2}$ |
| Surface tension | 18.0 dynes/cm |
| Flash point-closed cup | 77° C./170.6° F. |
| Freeze point | −40° C. |
| Boiling point @ 760 mmHg | 210° C. |
| Vapor pressure | 1.0 mmHg (20° C.) |
| Evaporation rate | <1 (Butyl Acetate = 1) |
| Heat of vaporization | 157 kJ/kg |

Figure 13:
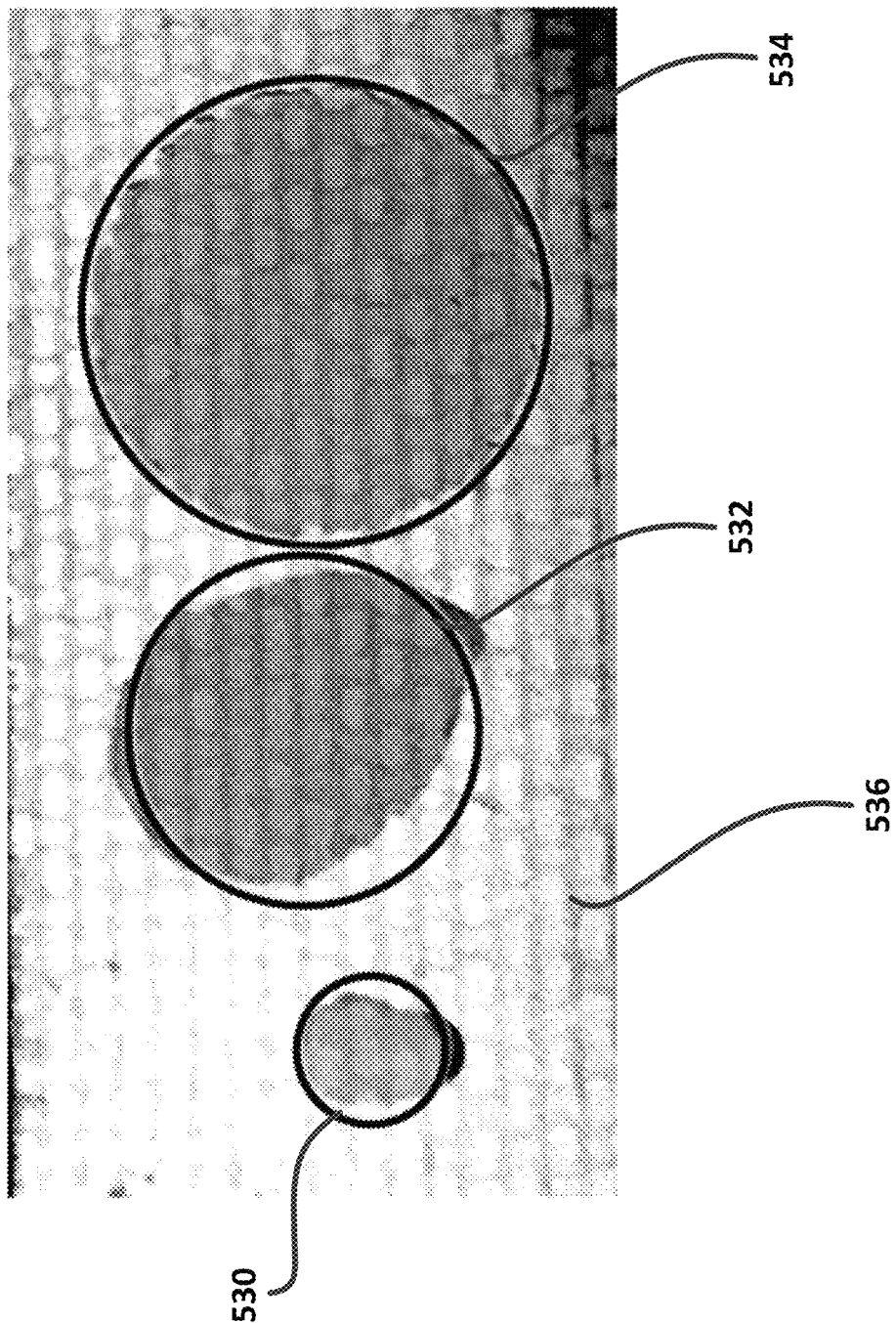
FIG. 13—Photograph showing the spreading areas for Boelube® 70104, VMS (D5), and a 50:50 (v:v) mixture of D5 and Boelube® 70104 on a CFRP substrate.

FIG. 13 is photograph showing the spreading areas for neat Boelube® 70104 (530), neat VMS (D5) (532), and a 50:50 (v:v) mixture of D5 and Boelube® 70104 (534) on an exemplary CFRP (536) substrate. Referring to FIG. 13, spreading areas were measured for a 0.5 ml drop of said compositions placed on an unheated CFRP surface (536) and allowed to spread to a maximum diameter over several minutes, and photographed before the VMS component evaporated. As shown in FIG. 13, the VMS (D5) spread area (532) is 600% larger than neat undiluted Boelube® area (530). The 50:50 (v:v) composition of D5 and Boelube® 70104 (534) is 167% larger than neat VMS (D5), and 1000% larger than neat Boelube®. A enlarged photograph of the 50:50 (v:v) DS:Boelube® 70104 droplet (534) is shown under FIG. 14.

Figure 14:
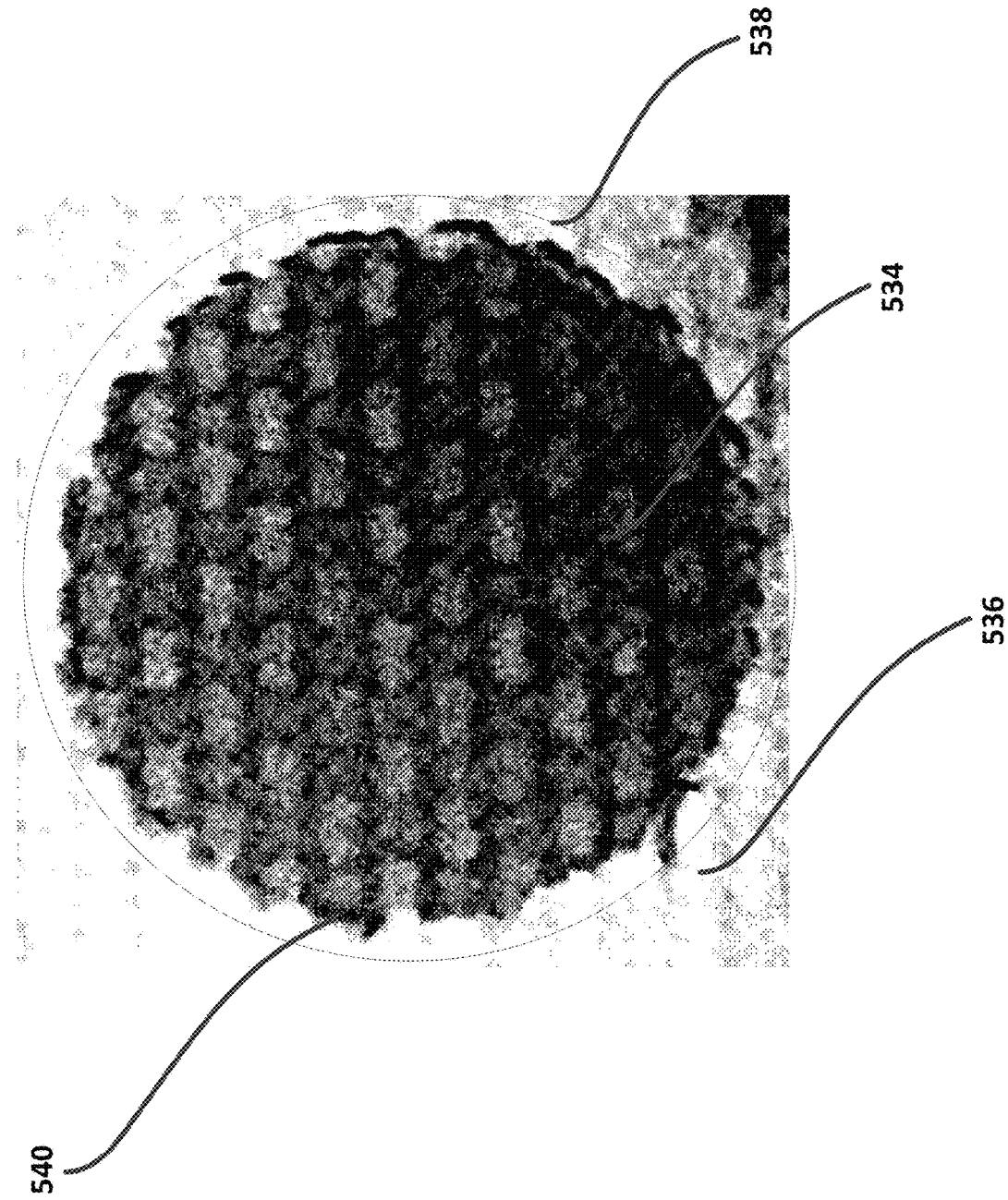
FIG. 14—Photograph showing the enlarged spherical spread of the 50:50 (v:v) mixture of D5 and Boelube® 70104 shown under FIG. 13.

As can be seen in FIG. 14, the superspread DS:Boelube® droplet (534) exhibits near perfect circularity (538) on a level and relatively uniform and smooth CFRP surface. The droplet (534) also exhibits circumferential tears (540), all of which are characteristic of a Marangoni flow.

Figure 15:
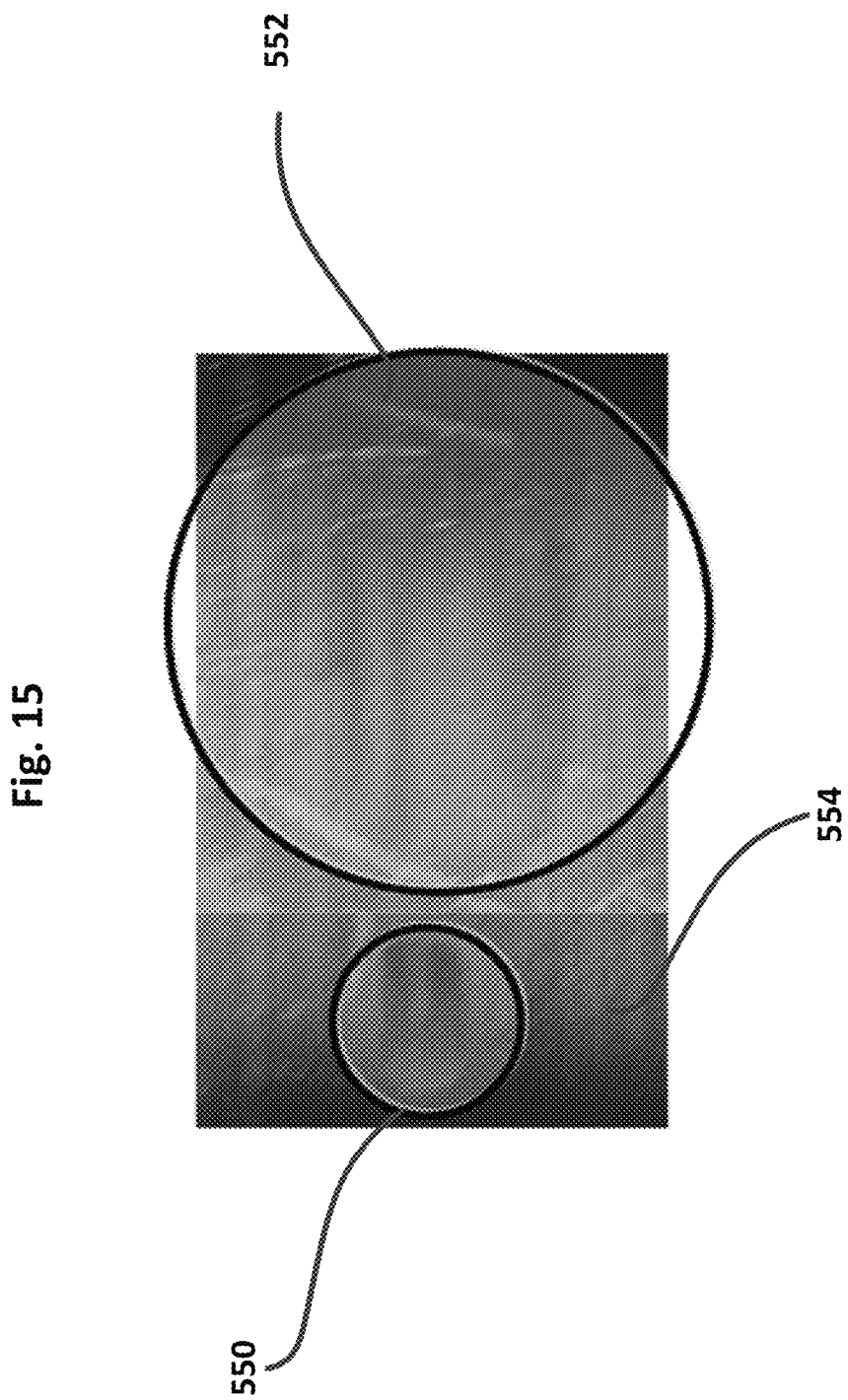
FIG. 15—Photograph showing the spreading areas for Boelube® 70104 and a 50:50 (v:v) mixture of D5 and Boelube® 70104 on an Aluminum substrate.

FIG. 15 is photograph showing the spreading areas for Boelube® 70104 (550) and a 50:50 (v:v) mixture of D5 and Boelube® 70104 (552) on a rough and grooved Aluminum substrate (554). Referring to FIG. 15, spreading areas were measured for a 0.5 ml drop of said compositions placed on an unheated Aluminum surface (554) and allowed to spread to a maximum diameter over several minutes, and photographed before the VMS carrier solvent evaporated from the composition. The 50:50 (v:v) mixture of D5 and Boelube® 70104 (552) droplet area is 800% larger than the neat Boelube® droplet.

Figure 16:
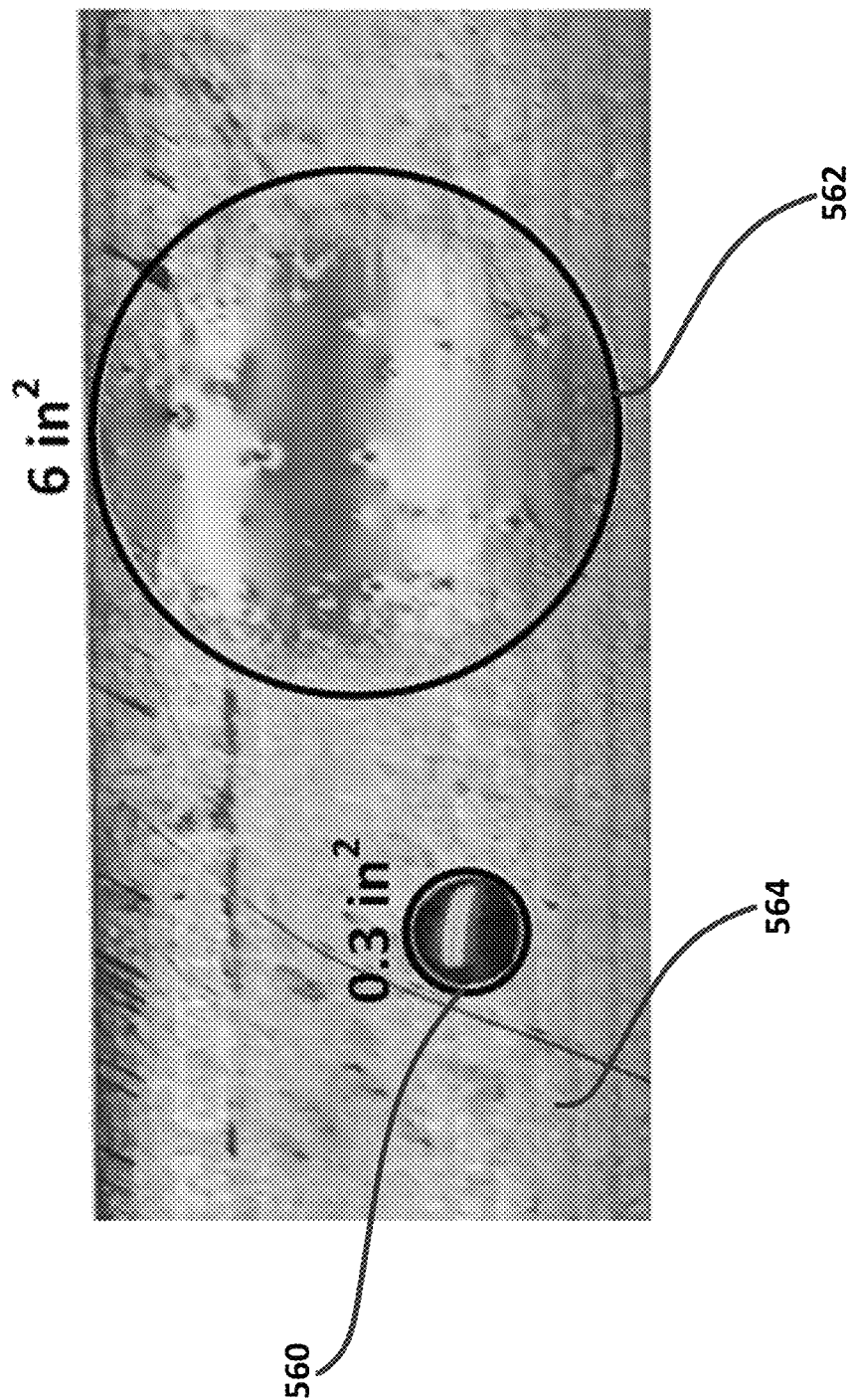
FIG. 16—Photograph showing the spreading areas for Boelube® 70104 and a 90:10 (v:v) mixture of D5 and Boelube® 70104 on a CFRP substrate.

FIG. 16 is a photograph showing the spreading areas for Boelube® 70104 (560) and a 90:10 (v:v) mixture of D5 and Boelube® 70104 (562) on a CFRP substrate (564). Referring to FIG. 16, spreading areas were measured for a 0.5 ml drop of said compositions placed on an unheated CFRP surface (564) and allowed to spread to a maximum diameter over several minutes, and photographed before the VMS carrier solvent evaporated from the composition. The 50:50 (v:v) mixture of D5 and Boelube® 70104 (562) droplet area is 2000% larger than the neat Boelube® droplet. Tears are visible on the spreading circumference as well. The spreading diameter of the more dilute composition is twice that of the concentrated mixture, however the circularity was not as pronounced as the more concentrated D5:Boelube® composition under FIGS. 14 and 15. This is thought to be due to non-uniform and faster evaporation of the D5 carrier solvent and thin film deposition during spreading. Also notable is the difference between the neat Boelube® droplets of FIG. 16 (560) and FIG. 15 (550). The polar Boelube® droplet spread area is about 267% larger on the polar Aluminum surface, indicative of better wetting of the metal surface as compared to the polymer surface. This also may contribute to the differences in spreading diameters observed on metal (polar) and CFRP (non-polar) surfaces for the exemplary compositions.

Having discussed the major embodiments and key aspects of the present invention, following is a discussion of machining tests performed using an experimental apparatus comprising the embodiments and keys aspects of the present invention. Hole drilling tests were performed on Ti-CFRP and Ti—Al-CFRP stack-ups using a 90:10 (v:v) (D5:Boelube® 70104) superspreading lubricant composition in accordance with the present invention. Test methods and results achieved are discussed in the following section.

EXPERIMENTAL

During hole making operations in preparation for fasteners on aircraft fuselage and wings, the drill temperature becomes very high during Titanium (Ti) drilling due to its poor thermal conductivity. Cutting edge temperatures can range between 500 and 1000 Deg. C. depending upon cutting conditions. Insufficient heat management during Ti machining results in increased tool wear rates and poor surface finish. Similarly, during drilling of Carbon Fiber Reinforced Polymer (CFRP), the drill temperature increases significantly due to abrasive frictional heating by carbon particles. Insufficient heat management during CFRP drilling can result in burning, delamination, fiber pull-out, and poor drilled-hole circularity. As such, drilling combinations Ti, CFRP, and Aluminum (Al) (termed Stack-ups) represent a very challenging drilling operation. Key machining factors include optimum drilling tools and coatings, speeds and feed rates, the use of micro-pecking for Ti in particular, as well as proper cooling-lubrication.

The effectiveness of the present invention to reduce drilling temperature (and improve hole quality) during processing of stack-ups was measured using a thermocouple affixed to the backside of a stack-up near or on the point of drill exit. Another indicator of optimal cooling-lubrication is drilled hole quality—in terms of surface finish, circularity and exit burr height. A portable drilling tool, available from Apex Tool Group, Lexington, S.C., was used with typical cutters, and drilling speeds and feed rates held constant and within generally-accepted parameters for a particular stack-up test. In the tests and results described below, a 90:10 (v:v) (DS:Boelube® 70104) superspreading lubricant composition was used with an injection rate fixed at 75 ml/hour, with an actual realized Boelube® 70104 oil injection rate of approximately 22 ml/hour (10% of D5:Boelube® composition injection rate) in accordance with the present invention. As such, these tests were comparative in nature without concern for optimizing mechanical aspects of the drilling operation.

Test #1:

A through-hole drilling test was preformed to demonstrate the efficacy of the present invention. A stack-up coupon comprising two 0.5 inch thick titanium panels sandwiching one 1.0 inch thick CFRP panel were repeatedly drilled using a 0.5 inch diameter uncoated tungsten carbide drill. Due to the relatively large flowrate allowable through spindle and tool during this test, continuous $CO_2$ cooling using a small high pressure micro-throttle was permissible. Drill exit temperatures of 180 deg. F. and higher were observed during conventional MQL drilling using Boelube® 70104 straight oil (1.1 ml/min) at 75 psi air pressure. Tests performed with the current invention demonstrated lower drill exit temperatures between 90 deg. F. and 120 deg. F., or temperature reductions of between 30% and 60%, depending upon the absence or presence of an exemplary minimum quantity lubricant composition of the present invention—Dry R744 continuous and low-frequency cooling, and R744 MQCL continuous and low-frequency cooling-lubrication, respectively. The coolest drilling temperatures (less than 100 deg. F.) and best quality drilled holes (including circularity and lowest exit burr height) were observed using the following R744 MQCL procedure and parameters:

1. Air pressure increased to 75 psi at a continuous flowrate of 2.25 scfm through spindle and cutting tool.
2. Continuous charging and injection/infusion of supersaturated $CO_2$ at 1000 psi using a 0.010 inch micro-throttle delivering approximately 0.05 lbs. $CO_2$/min
3. Injection of superspreading ultra-MQL additive (90% D5 and 10% Boelube 70104 (v:v)) at approximately 1.25 ml/min
4. Hole drilling operation initiated.
5. Completion of through-hole drilling operation.
6. Termination of additive injection.
7. Termination of $CO_2$ charging and infusion.
8. Release of residual $CO_2$ capillary coolant into propellant air upon completion of drill-through.
9. Air pressure reduced to ambient pressure.
10. Drilling system de-energized.

Test #2:

A R744 MQCL drilling test was performed using a 0.250 inch diameter uncoated tungsten carbide drilling tool on a stack-up comprising two 0.5 inch Ti panels sandwiching one 0.5 inch thick Al panel. Due to much smaller diameter drilling tool coolant ports, the allowable flowrate through the spindle-tool system was reduced significantly which necessitated the use of a low frequency pulsed cooling cycle. Satisfactory drilling temperatures (<100 deg. F.) and drilled hole quality were achieved using the following R744 MQCL procedure and parameters:

1. Air pressure increased to 75 psi at a continuous flowrate of 0.75 scfm through spindle and cutting tool.
2. Injection of superspreading ultra-MQL additive (10 parts D5 and 1 part Boelube 70104 (10:1)) at approximately 1.1 ml/min.
3. Repeated pulse charging and infusion of supersaturated $CO_2$ at 1200 psi using a 0.010 inch micro-throttle delivering approximately 0.06 lbs. $CO_2$/min for charging time (CT) of 5 seconds, followed by an infusion time (IT) of approximately 30 seconds to reach a release-recycle pressure (RP) of approximately 700 psi, release of spent $CO_2$ coolant into propellant air, and followed by a repeat charging cycle;
4. Hole drilling operation initiated.
5. Completion of hole drilling operation.
6. Termination of additive injection.
7. Termination of $CO_2$ pulse charging and infusion.
8. Release of residual $CO_2$ capillary coolant into propellant air upon completion of drill-through.
9. Air pressure reduced to ambient pressure.
10. Drilling system de-energized.

Both of these experimental tests were performed to optimize, contrast and compare the performance of the present invention to reduce drilling temperatures (and optimal hole quality) under the non-optimized drilling conditions imposed and did not represent optimal MQCL parameters for the many possible and different combinations of hole drilling parameters—stack-up combinations, speeds, feed rates, cutting tools and tool coatings (i.e., PCD) that can be utilized.

In both tests performed, the conclusion was that both MQCL and dry $CO_2$ pulse coolant drilling methods were superior to conventional MQL in terms of heat management. However for stack-up drilling operations using uncoated tungsten carbide drills, the presence of the trace amount of lubrication using an exemplary formulation of the present invention produced the lowest drilling temperatures and best quality drilled holes.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the title, headings, terms and phrases used herein are not intended to limit the subject matter or scope; but rather, to provide an understandable description of the invention. The invention is composed of several sub-parts that serve a portion of the total functionality of the invention independently and contribute to system level functionality when combined with other parts of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

INCORPORATION BY REFERENCE

All publications, patents, and patent applications mentioned in this specification are herein incorporated by reference to the same extent as if each individual publication, patent, or patent application was specifically and individually indicated to be incorporated by reference, including U.S. Pat. No. 9,221,067.

We claim:

1. An apparatus for cooling a through-ported cutting tool, which has a through-port diameter, with a source of liquid $CO_2$ comprising:
    a compressed air line, which has a compressed air inlet and establishes a flow of compressed air to the cutting tool, and the compressed air line has a first $CO_2$ injection capillary segment and a second $CO_2$ injection capillary segment;
    the first and the second $CO_2$ injection capillary segments are interconnected to the same source of liquid $CO_2$;
    the first $CO_2$ injection capillary segment has a first high pressure valve, and the second $CO_2$ injection capillary segment has a second high pressure valve, and the source of liquid $CO_2$ has a third high pressure valve;
    the first $CO_2$ injection capillary segment has a first throttle and the second $CO_2$ injection capillary segment has a second throttle;
    the first throttle is smaller than the second throttle;
    the first $CO_2$ injection capillary segment terminates near the cutting tool;
    the second $CO_2$ injection capillary segment terminates near the compressed air inlet;
    whereby the third valve and first valve are opened, and an amount of liquid $CO_2$, which corresponds to the diameter of the through-port of the cutting tool, charges the first $CO_2$ injection capillary segment with liquid $CO_2$ at a predetermined charging pressure;
    the third valve is closed, and the liquid $CO_2$ in the first $CO_2$ injection capillary segment is mixed into the compressed air near the cutting tool for a predetermined period of time and to predetermined recycle pressure to form a first cooling fluid;
    the second valve is opened, and residual $CO_2$ in the first $CO_2$ injection capillary segment flows through the second $CO_2$ injection capillary segment, into the compressed air and near the compressed air inlet to form a second cooling fluid;
Flowing said first and the second cooling fluids through said cutting tool; and
    the cutting tool is maintained within a certain temperature range.

2. The apparatus of claim 1 wherein said compressed air pressure is between 30 psi and 500 psi.

3. The apparatus of claim 1 wherein said compressed air flows between 0.5 and 20 scfm.

4. The apparatus of claim 1 wherein said liquid $CO_2$ is injected in the first $CO_2$ injection capillary segment from a charging pressure of between 900 and 5000 psi and to a recycle pressure of between 400 and 750 psi.

5. The apparatus of claim 4 wherein said liquid $CO_2$ is injected into the first $CO_2$ injection capillary segment at a flowrate of between 0.1 lbs./hour and 20 lbs./hour.

6. The apparatus of claim 1 wherein said liquid $CO_2$ is injected into the second $CO_2$ injection capillary segment from a pressure of between 500 and 750 psi and to a pressure, which is equal to the compressed air pressure.

7. The apparatus of claim 1 wherein a small amount of liquid lubricant is injected into the second cooling fluid.

8. The apparatus of claim 7 wherein said liquid lubricant comprises synthetic oil, semi-synthetic oil, mineral oil, bio-based oil, polyalkylene glycol, polyolester or alcohol.

9. The apparatus of claim 7 wherein said liquid lubricant is injected into the second cooling fluid at a flowrate of between 10 ml/hour and 250 ml/hour.

10. The apparatus of claim 8 wherein said liquid lubricant is a fractional solute of a volatile carrier solvent to form a dilute liquid lubricant fluid.

11. The apparatus of claim 10 wherein said volatile carrier solvent comprises a cyclic volatile methyl siloxane, alcohol, ketone or alkene.

12. The apparatus of claim 7 wherein said liquid lubricant is co-injected and mixed with the second cooling fluid using a telescoping lance.

13. The apparatus of claim 1 is controlled automatically using a PLC, digital timers or pressure switches.

14. The apparatus of claim 1 is controlled using cutting force data.

15. The apparatus of claim 1 wherein the second throttle is adjustable.

16. An apparatus for cooling a through-ported cutting tool, which has a through-port diameter, with a source of liquid $CO_2$ comprising:
    a compressed air line, which has a compressed air inlet and establishes a flow of compressed air to the cutting tool, and the compressed air line has a first $CO_2$ injection capillary segment and a second $CO_2$ injection capillary segment;
    the first and the second $CO_2$ injection capillary segments are interconnected to the same source of liquid $CO_2$;
    the first $CO_2$ injection capillary segment has a first high pressure valve, and the second $CO_2$ injection capillary segment has a second high pressure valve, and the source of liquid $CO_2$ has a third high pressure valve;
    the first $CO_2$ injection capillary segment has a first throttle, and the second $CO_2$ injection capillary segment has a second throttle;
    the first throttle is smaller than the second throttle;
    the first $CO_2$ injection capillary segment terminates near the cutting tool;
    the second $CO_2$ injection capillary segment terminates near the compressed air inlet;
    whereby the third valve and first valve are opened, and an amount of liquid $CO_2$, which corresponds to the diameter of the through-port of the cutting tool, charges the first $CO_2$ injection capillary segment with liquid $CO_2$ at a predetermined charging pressure;
    the third valve is closed, and the liquid $CO_2$ in the first $CO_2$ injection capillary segment is mixed into the compressed air near the cutting tool for a predetermined period of time and to predetermined recycle pressure to form a first cooling fluid;
    the second valve is opened, and residual $CO_2$ in the first $CO_2$ injection capillary segment flows through the second $CO_2$ injection capillary segment, into the compressed air and near the compressed air inlet to form a second cooling fluid;

the first, second, and third valves are controlled using digital timers;

the second throttle is adjustable;

flowing said first and second cooling fluids through said cutting tool; and the cutting tool is maintained within a certain temperature range.

17. An apparatus for cooling a through-ported cutting tool, which has a through-port diameter, with a source of liquid $CO_2$ comprising:

- a compressed air line, which has a compressed air inlet and establishes a flow of compressed air to the cutting tool, and the compressed air line has a first $CO_2$ injection capillary segment and a second $CO_2$ injection capillary segment;
- the first and the second $CO_2$ injection capillary segments are interconnected to the same source of liquid $CO_2$;
- the first $CO_2$ injection capillary segment has a first high pressure valve, and the second $CO_2$ injection capillary segment has a second high pressure valve, and the source of liquid $CO_2$ has a third high pressure valve;
- the first $CO_2$ injection capillary segment has a first throttle, and the second $CO_2$ injection capillary segment has a second throttle;
- the first throttle is smaller than the second throttle;
- the first $CO_2$ injection capillary segment terminates near the cutting tool;
- the second $CO_2$ injection capillary segment terminates near the compressed air inlet;
- whereby the third valve and first valve are opened, and an amount of liquid $CO_2$ charges the first capillary segment;
- the third valve is closed, and the liquid $CO_2$ in the first $CO_2$ injection capillary segment is mixed into the compressed air and near the cutting tool to form a first cooling fluid;
- the second valve is opened, and residual $CO_2$ in the first capillary segment flows through the second $CO_2$ injection capillary segment, into the compressed air and near the compressed air inlet to form a second cooling fluid;

Flowing said first and the second cooling fluids through said cutting tool; and the cutting tool is maintained within a certain temperature range.

* * * * *